(12) United States Patent
Beeler et al.

(10) Patent No.: US 9,639,737 B2
(45) Date of Patent: May 2, 2017

(54) METHODS AND SYSTEMS OF PERFORMING PERFORMANCE CAPTURE USING AN ANATOMICALLY-CONSTRAINED LOCAL MODEL

(71) Applicant: Disney Enterprises, Inc., Burbank, CA (US)

(72) Inventors: Thabo Beeler, Zürich (CH); Derek Bradley, Zürich (CH); Chenglei Wu, Zürich (CH)

(73) Assignees: ETH ZÜRICH (EIDGENÖESSISCHE TECHNISCHE HOCHSCHULE ZÜRICH), Zürich (CH); DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 14/869,735

(22) Filed: Sep. 29, 2015

(65) Prior Publication Data

US 2017/0091529 A1    Mar. 30, 2017

(51) Int. Cl.
*G06K 9/00*   (2006.01)
*G06T 7/20*   (2017.01)
*G06T 7/00*   (2017.01)

(52) U.S. Cl.
CPC ..... *G06K 9/00214* (2013.01); *G06K 9/00228* (2013.01); *G06K 9/00315* (2013.01); *G06T 7/0081* (2013.01); *G06T 7/2033* (2013.01)

(58) Field of Classification Search
CPC .......... G06K 9/00214; G06K 9/00228; G06K 9/00315; G06K 9/00201; G06T 7/0081; G06T 7/2033; G06T 17/20; H04N 5/225
(Continued)

(56) References Cited

U.S. PATENT DOCUMENTS 6,944,320 B2 *  9/2005  Liu ................... G06K 9/00201
                                                          345/419
8,922,553 B1 * 12/2014  Tena ..................... G06T 17/00
                                                          345/419
(Continued)

OTHER PUBLICATIONS

Beeler, T. et al., "Rigid stabilization of facial expressions," ACM Trans. Graphics (Proc. SIGGRAPH), 2014, vol. 33, No. 4, pp. 44:1-44:9.
(Continued)

*Primary Examiner* — Yon Couso
(74) *Attorney, Agent, or Firm* — Kilpatrick Townsend & Stockton LLP

(57) ABSTRACT

Techniques and systems are described for generating an anatomically-constrained local model and for performing performance capture using the model. The local model includes a local shape subspace and an anatomical subspace. In one example, the local shape subspace constrains local deformation of various patches that represent the geometry of a subject's face. In the same example, the anatomical subspace includes an anatomical bone structure, and can be used to constrain movement and deformation of the patches globally on the subject's face. The anatomically-constrained local face model and performance capture technique can be used to track three-dimensional faces or other parts of a subject from motion data in a high-quality manner. Local model parameters that best describe the observed motion of the subject's physical deformations (e.g., facial expressions) under the given constraints are estimated through optimization. The optimization can solve for rigid local patch motion, local patch deformation, and the rigid motion of the anatomical bones. The solution can be formulated as an energy minimization problem for each frame that is obtained for performance capture.

20 Claims, 20 Drawing Sheets
(4 of 20 Drawing Sheet(s) Filed in Color)

(58) Field of Classification Search
USPC .......................................................... 382/118
See application file for complete search history.

(56) References Cited

U.S. PATENT DOCUMENTS

| | | | | |
|---|---|---|---|---|
| 2005/0057569 | A1* | 3/2005 | Berger | G06T 13/40 345/473 |
| 2010/0053172 | A1* | 3/2010 | DeRose | G06T 17/20 345/473 |
| 2012/0185218 | A1* | 7/2012 | Bickel | G06T 19/20 703/1 |

OTHER PUBLICATIONS

Beeler, T. et al., "High-quality single-shot capture of facial geometry," ACM Trans. Graphics (Proc. SIGGRAPH), 2010.
Beeler, T. et al., "High-quality passive facial performance capture using anchor frames," ACM Trans. Graphics (Proc. SIGGRAPH), 2011, vol. 30, pp. 75:1-75:10.
Black, M. et al., "Tracking and recognizing rigid and non-rigid facial motions using local parametric models of image motion," ICCV, 1995, pp. 374-381.
Blanz, V. et al., "A morphable model for the synthesis of 3d faces," Proc. SIGGRAPH, 1999, pp. 187-194.
Bouaziz, S. et al., "Online modeling for realtime facial animation," ACM Trans. Graphics (Proc. SIGGRAPH), 2013, vol. 32, No. 4, pp. 40:1-40:10.
Bradley, D. et al., "High resolution passive facial performance capture," ACM Trans. Graphics (Proc. SIGGRAPH), 2010, vol. 29, pp. 41:1-41:10.
Bregler, C. et al., "Twist based acquisition and tracking of animal and human kinematics," IJCV, 2004, vol. 56, No. 3, pp. 179-194.
Brox, T. et al., "High accuracy optical flow estimation based on a theory for warping," ECCV, 2004, pp. 25-36.
Brunton, A. et al., "Multilinear wavelets: A statistical shape space for human faces," ECCV, 2014.
Cao, C. et al., "3d shape regression for real-time facial animation," ACM Trans. Graphics (Proc. SIGGRAPH), 2013, vol. 32, No. 4, pp. 41:1-41:10.
Cao, C. et al., "Displaced dynamic expression regression for real-time facial tracking and animation," ACM Trans. Graphics (Proc. SIGGRAPH), 2014, vol. 33, No. 4, pp. 43:1-43:10.
Cao, C. et al., "Real-time high-fidelity facial performance capture," ACM Trans. Graphics (Proc. SIGGRAPH), 2015.
Chen, Y.-L. et al., "Accurate and robust 3d facial capture using a single rgbd camera," ICCV, 2013.
Cootes, T. F. et al., "Active appearance models," IEEE TPAMI, 2001, vol. 23, No. 6, pp. 681-685.
DeCarlo, D. et al., "The integration of optical flow and deformable models with applications to human face shape and motion estimation," CVPR, 1996, pp. 231-238.
Essa, I. et al., "Modeling, tracking and interactive animation of faces and heads using input from video," Proc. of Computer Animation, 1996, pp. 68-79.
Furukawa, Y. et al., "Dense 3d motion capture for human faces," CVPR, 2009.
Fyffe, G. et al., "Comprehensive facial performance capture," Computer Graphics Forum (Proc. Eurographics), 2011.
Fyffe, G. et al., "Driving high-resolution facial scans with video performance capture," ACM Trans. Graphics, 2014, vol. 34, No. 1, pp. 8:1-8:14.
Garrido, P. et al., "Reconstructing detailed dynamic face geometry from monocular video," ACM Trans. Graphics (Proc. SIGGRAPH Asia), 2013, vol. 32, No. 6, pp. 158:1-158:10.
Ghosh, A. et al., "Multiview face capture using polarized spherical gradient illumination," ACM Trans. Graphics (Proc. SIGGRAPH Asia), 2011, vol. 30, No. 6, pp. 129:1-129:10.
Huang, H. et al., "Leveraging motion capture and 3d scanning for high-fidelity facial performance acquisition," ACM Trans. Graphics (Proc. SIGGRAPH), 2011, vol. 30, No. 4, pp. 74:1-74:10.
Joshi, P. et al., "Learning controls for blend shape based realistic facial animation," SCA, 2003, pp. 187-192.
Li, H. et al., "3-d motion estimation in model-based facial image coding," IEEE TPAMI, 1993, vol. 15, No. 6, pp. 545-555.
Li, H. et al., "Realtime facial animation with on-the-fly correctives," ACM Trans. Graphics (Proc. SIGGRAPH), 2013, vol. 32, No. 4, pp. 42:1-42:10.
Neumann, T. et al., "Sparse localized deformation components," ACM Trans. Graphics (Proc. SIGGRAPH Asia), 2013, vol. 32, No. 6, pp. 179:1-179:10.
Rhee, T. et al., "Real-time facial animation from live video tracking," Proc. SCA, 2011, pp. 215-224.
Saragih, J. M. et al., "Deformable model fitting by regularized landmark mean-shift," IJCV, 2011, vol. 91, No. 2, pp. 200-215.
Shi, F. et al., "Automatic acquisition of high-fidelity facial performances using monocular videos," ACM Trans. Graphics (Proc. SIGGRAPH Asia), 2014, vol. 33.
Suwajanakorn, S. et al., "Total moving face reconstruction," ECCV, 2014.
Tena, J. R. et al., "Interactive region-based linear 3d face models," ACM Trans. Graphics (Proc. SIGGRAPH), 2011, vol. 30, No. 4, pp. 76:1-76:10.
Valgaerts, L. et al., "Lightweight binocular facial performance capture under uncontrolled lighting," ACM Trans. Graphics (Proc. SIGGRAPH Asia), 2012, vol. 31, No. 6.
Vlasic, D. et al., "Face transfer with multilinear models," ACM Trans. Graphics (Proc. SIGGRAPH), 2005, vol. 24, No. 3, pp. 426-433.
Weise, T. et al., "Face/off: live facial puppetry," Proc. SCA, 2009, pp. 7-16.
Weise, T. et al., "Realtime performance-based facial animation," ACM Trans. Graphics (Proc. SIGGRAPH), 2011, vol. 30, No. 4, pp. 77:1-77:10.
Zhang, L. et al., "Spacetime faces: high resolution capture for modeling and animation," ACM Trans. Graphics (Proc. SIGGRAPH), 2004, pp. 548-558.
Zollhöfer, M. et al., "Real-time non-rigid reconstruction using an rgb-d camera," ACM Trans. Graphics (Proc. SIGGRAPH), 2014, vol. 33, No. 4, pp. 156:1-156:12.

* cited by examiner

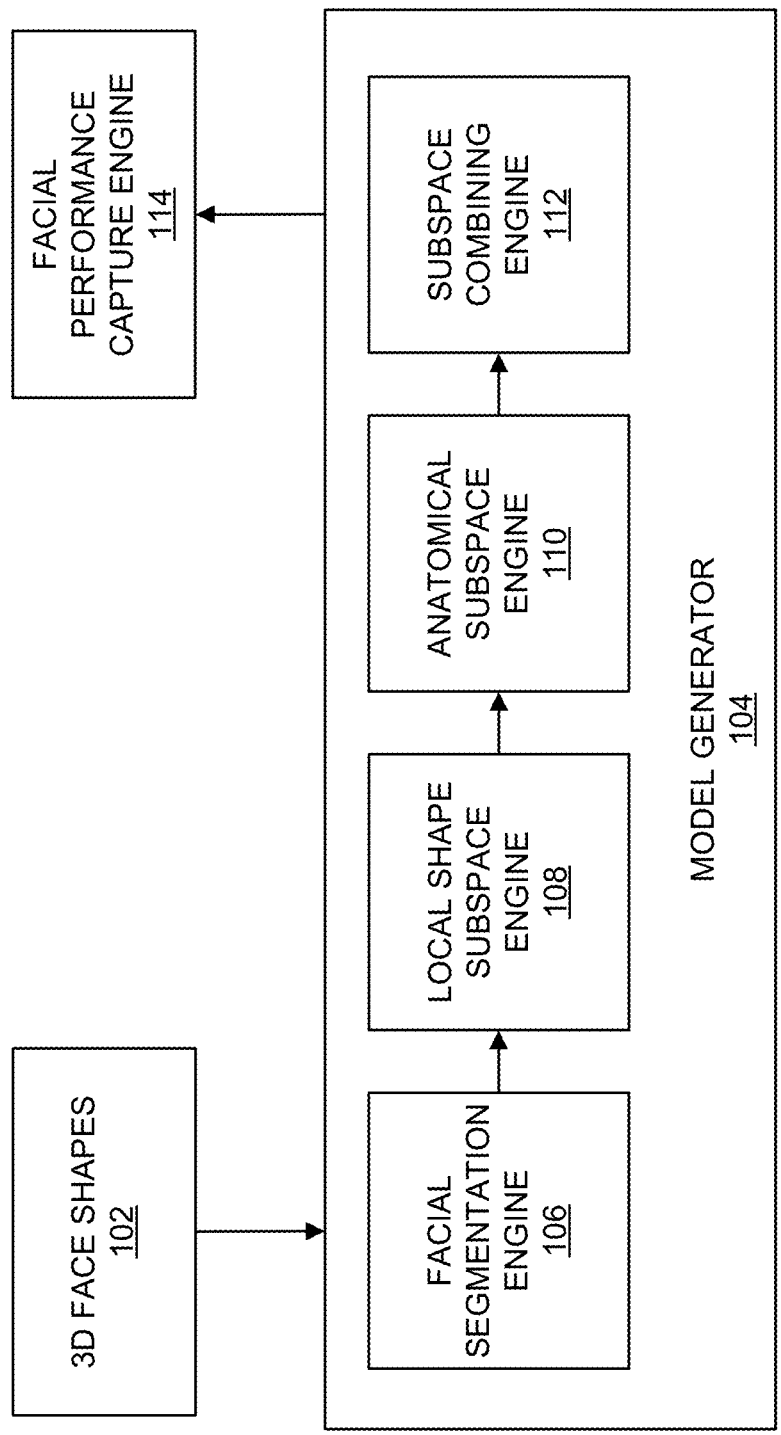

720

```
OBTAIN ONE OR MORE THREE-DIMENSIONAL SHAPES OF
A PART OF A SUBJECT
722
             │
             ▼
SEGMENT THE PART INTO A PLURALITY OF PATCHES
724
             │
             ▼
DETERMINE A LOCAL SHAPE SUBSPACE INCLUDING A
PLURALITY OF DEFORMATION SHAPES FOR EACH PATCH
726
             │
             ▼
DETERMINE AN ANATOMICAL SUBSPACE INCLUDING A
RIGID STRUCTURE CONSTRAINING EACH OF THE
PLURALITY OF PATCHES
728
             │
             ▼
GENERATE AN ANATOMICALLY-CONSTRAINED MODEL OF
THE PART BY COMBINING THE LOCAL SHAPE SUBSPACE
AND THE ANATOMICAL SUBSPACE
730
```

FIG. 7B

GOPRO SETUP IPHONE SETUP
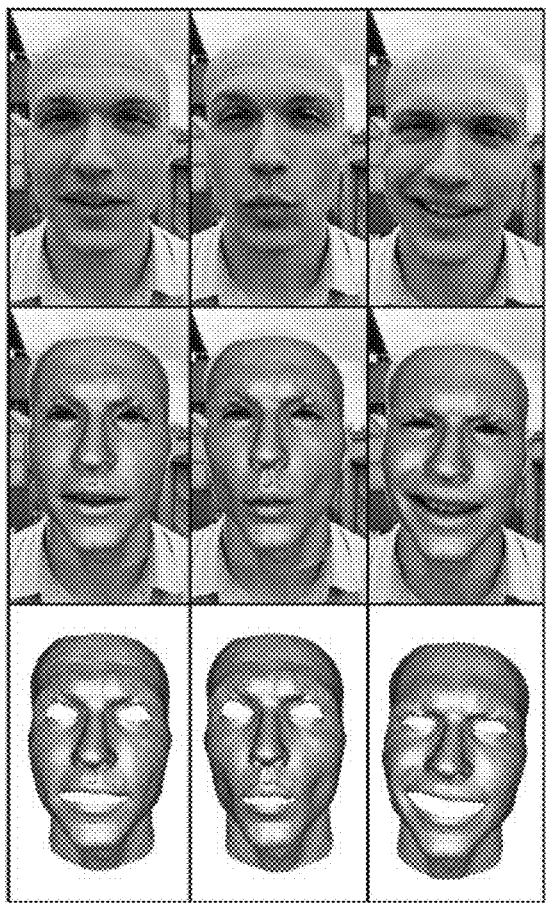
FIG. 15

METHODS AND SYSTEMS OF PERFORMING PERFORMANCE CAPTURE USING AN ANATOMICALLY-CONSTRAINED LOCAL MODEL

CROSS-REFERENCE TO RELATED APPLICATIONS

This application is related to U.S. application Ser. No. 14/869,717, titled "METHODS AND SYSTEMS OF GENERATING AN ANATOMICALLY-CONSTRAINED LOCAL MODEL FOR PERFORMANCE CAPTURE," filed on the same date herewith, which is hereby incorporated herein by reference, in its entirety.

FIELD

The present disclosure relates generally to performance capture, and more specifically to performance capture using an anatomically-constrained local model.

BACKGROUND

Facial performance capture is used for modern visual effects in various media works. For example, animated representations of subjects or actors can be generated for films, video games, or other media works using facial performance capture techniques. Facial performance capture has attracted much attention from the research community and evolved rapidly in recent decades. It is a goal to acquire the face in ever more detail to provide higher quality face shapes and dynamics. On the other hand, the area also seeks less constrained acquisition setups, which require less hardware and give the subject or actor more freedom to perform.

SUMMARY

Techniques and systems are described for generating an anatomically-constrained local model. For example, an anatomically-constrained local face model (also referred to herein as a local face model) may be generated for a subject's face. In another example, an anatomically-constrained local part model can be generated for a portion or part of a subject or other object. The local face model, for example, includes a local shape subspace and an anatomical subspace. The local shape subspace is learned from a set of training shapes, and constrains local deformation of various patches that represent the geometry of a subject's face. Global motion or position on the face of the various patches is defined by a rigid transformation. For each patch, a rigid transformation component and local shape subspace coefficients are defined. The anatomical subspace includes an anatomical bone structure or other rigid structure that may not include actual bones (e.g., a frame used to support a non-rigid or soft substance or tissue). For example, a subject-specific computer-generated skull and/or a jawbone are created, and motion of the bone structures is defined. The anatomical subspace can be used to constrain movement and deformation of the patches globally on the subject's face, for example by considering the varying skin (or other soft or non-rigid tissue) thickness between the patches and the bones (or other rigid structural component).

Techniques and systems are also described for performing facial performance capture (also referred to as facial performance tracking, fitting, or reconstruction) using an anatomically-constrained local model. The anatomically-constrained local face model and performance capture technique can be used to track three-dimensional faces from motion data in a high-quality manner. Local face model parameters that best describe the observed motion of the subject's facial expressions under the given constraints are estimated through optimization using, for example, an energy function. For example, the optimization can solve for rigid local patch motion, local patch deformation (e.g., local blend coefficients), and the rigid motion of the anatomical bones or other rigid structural component (e.g., skull and jaw motion). The solution can be formulated as an energy minimization problem for each frame that is obtained for performance capture.

According to at least one example, a computer-implemented method of generating an anatomically-constrained model of a face of a subject is provided that includes obtaining one or more three-dimensional shapes of the face of the subject and segmenting the face into a plurality of patches. The method further includes determining a local shape subspace. The local shape subspace includes a plurality of deformation shapes for each patch of the plurality of patches. A deformation shape of a patch defines a deformation of the patch for a facial expression. The method further includes determining an anatomical subspace. The anatomical subspace includes an anatomical bone structure (or other rigid structure) constraining each of the plurality of patches. The method further includes generating the anatomically-constrained model of the face by combining the local shape subspace and the anatomical subspace.

In some embodiments, a system is provided for generating an anatomically-constrained model of a face of a subject. The system includes a memory storing a plurality of instructions and one or more processors. The one or more processors are configurable to: obtain one or more three-dimensional shapes of the face of the subject; segment the face into a plurality of patches; determine a local shape subspace, the local shape subspace including a plurality of deformation shapes for each patch of the plurality of patches, wherein a deformation shape of a patch defines a deformation of the patch for a facial expression; determine an anatomical subspace, the anatomical subspace including an anatomical bone structure constraining each of the plurality of patches; and generate the anatomically-constrained model of the face by combining the local shape subspace and the anatomical subspace.

In some embodiments, a computer-readable memory storing a plurality of instructions executable by one or more processors is provided. The plurality of instructions comprise: instructions that cause the one or more processors to obtain one or more three-dimensional shapes of a face of a subject; instructions that cause the one or more processors to segment the face into a plurality of patches; instructions that cause the one or more processors to determine a local shape subspace, the local shape subspace including a plurality of deformation shapes for each patch of the plurality of patches, wherein a deformation shape of a patch defines a deformation of the patch for a facial expression; instructions that cause the one or more processors to determine an anatomical subspace, the anatomical subspace including an anatomical bone structure constraining each of the plurality of patches; and instructions that cause the one or more processors to generate the anatomically-constrained model of the face by combining the local shape subspace and the anatomical subspace.

In some embodiments, determining the local shape subspace includes determining the plurality of deformation shapes by removing rigid motion from facial expressions included in the obtained one or more three-dimensional shapes. In some examples, the method, system, and computer-readable memory described above for generating an anatomically-constrained model may further include: aligning a deformed patch of a facial expression in an obtained three-dimensional shape with a corresponding neutral patch of a neutral facial expression to obtain an aligned patch; and subtracting a shape of the corresponding neutral patch from the aligned patch to obtain a deformation shape for the deformed patch.

In some embodiments, the anatomical bone structure constrains deformation and movement of each of the plurality of patches. In some examples, the anatomical bone structure includes at least one or more of a skull or a jawbone.

In some embodiments, the method, system, and computer-readable memory described above for generating an anatomically-constrained model may further include performing facial performance tracking of the subject using the anatomically-constrained model of the face. In some examples, the facial performance tracking is performed using input from a single camera.

According to another example, a computer-implemented method of performing facial performance tracking of a subject using an anatomically-constrained model of a face of the subject is provided that includes obtaining the anatomically-constrained model. The anatomically-constrained model includes a combination of a local shape subspace and an anatomical subspace, with the local shape subspace including deformation shapes for each patch of a plurality of patches representing a geometry of the face. A deformation shape of a patch defines a deformation of the patch for an observed facial expression. The anatomical subspace includes an anatomical bone structure constraining each of the plurality of patches. The method further includes obtaining motion data of the face of the subject as the subject conducts a performance, and determining, for each patch using the motion data, parameters of the anatomically-constrained model that match a facial expression in the performance. The method further includes modifying the plurality of patches using the determined parameters to match the plurality of patches to the facial expression in the performance. The method further includes combining the deformed plurality of patches into a global face mesh for the face.

In some embodiments, a system is provided for performing facial performance tracking of a subject using an anatomically-constrained model of a face of the subject. The system includes a memory storing a plurality of instructions and one or more processors. The one or more processors are configurable to: obtain the anatomically-constrained model, the anatomically-constrained model including a combination of a local shape subspace and an anatomical subspace, the local shape subspace including deformation shapes for each patch of a plurality of patches representing a geometry of the face, wherein a deformation shape of a patch defines a deformation of the patch for an observed facial expression, and wherein the anatomical subspace includes an anatomical bone structure constraining each of the plurality of patches; obtain motion data of the face of the subject as the subject conducts a performance; determine, for each patch using the motion data, parameters of the anatomically-constrained model that match a facial expression in the performance; modify the plurality of patches using the determined parameters to match the plurality of patches to the facial expression in the performance; and combine the deformed plurality of patches into a global face mesh for the face.

In some embodiments, a computer-readable memory storing a plurality of instructions executable by one or more processors is provided. The plurality of instructions comprise: instructions that cause the one or more processors to obtain an anatomically-constrained model of a face of a subject, the anatomically-constrained model including a combination of a local shape subspace and an anatomical subspace, the local shape subspace including deformation shapes for each patch of a plurality of patches representing a geometry of the face, wherein a deformation shape of a patch defines a deformation of the patch for an observed facial expression, and wherein the anatomical subspace includes an anatomical bone structure constraining each of the plurality of patches; instructions that cause the one or more processors to obtain motion data of the face of the subject as the subject conducts a performance; instructions that cause the one or more processors to determine, for each patch using the motion data, parameters of the anatomically-constrained model that match a facial expression in the performance; instructions that cause the one or more processors to modify the plurality of patches using the determined parameters to match the plurality of patches to the facial expression in the performance; and instructions that cause the one or more processors to combine the deformed plurality of patches into a global face mesh for the face.

In some embodiments, determining the parameters of the anatomically-constrained model includes: determining rigid local patch motion for each patch, the rigid local patch motion for a patch defining a position of the patch on the face; determining local patch deformation of each patch, the local patch deformation of a patch being defined by a combination of deformation components for the patch; and determining rigid motion of the underlying bone relative to each patch.

In some embodiments, modifying the plurality of patches using the determined parameters includes deforming a shape of each of the plurality of patches and moving each of the plurality of patches to a position on the face.

In some embodiments, the method, system, and computer-readable memory described above for performing facial performance tracking may further include determining a motion constraint. The motion constraint constrains deformation and motion of the plurality of patches to match the obtained motion data.

In some embodiments, the method, system, and computer-readable memory described above for performing facial performance tracking may further include determining an overlapping constraint. The overlapping constraint constrains overlapping vertices of neighboring patches to deform alike.

In some embodiments, the method, system, and computer-readable memory described above for performing facial performance tracking may further include determining an anatomical constraint. The anatomical constraint constrains deformation of the plurality of patches to the anatomical bone structure. In some examples, the anatomical constraint is further used to predict rigid motion of the anatomical bone structure.

In some embodiments, the method, system, and computer-readable memory described above for performing facial performance tracking may further include determining a temporal constraint. The temporal constraint constrains an amount of deformation change of a patch and a position change of the patch during a given time period.

In some embodiments, the motion data of the face is from a single point of view. In some examples, the motion data of the face is obtained from one or more images of the face, from one or more markers placed on the face, or from an illustration of the face.

According to another example, a computer-implemented method of generating an anatomically-constrained model of a subject is provided. The method includes obtaining one or more three-dimensional shapes of a part of the subject, and segmenting the part into a plurality of patches. The method further includes determining a local shape subspace. The local shape subspace includes a plurality of deformation shapes for each patch of the plurality of patches. A deformation shape of a patch defines a deformation of the patch for an observed shape of the part. The method further includes determining an anatomical subspace. The anatomical subspace includes a rigid structure constraining each of the plurality of patches. The method further includes generating the anatomically-constrained model of the part by combining the local shape subspace and the anatomical subspace.

In some embodiments, a system is provided for generating an anatomically-constrained model of a subject. The system includes a memory storing a plurality of instructions and one or more processors. The one or more processors are configurable to: obtain one or more three-dimensional shapes of a part of the subject; segment the part into a plurality of patches; determine a local shape subspace, the local shape subspace including a plurality of deformation shapes for each patch of the plurality of patches, wherein a deformation shape of a patch defines a deformation of the patch for an observed shape of the part; determine an anatomical subspace, the anatomical subspace including a rigid structure constraining each of the plurality of patches; and generate the anatomically-constrained model of the part by combining the local shape subspace and the anatomical subspace.

In some embodiments, a computer-readable memory storing a plurality of instructions executable by one or more processors is provided. The plurality of instructions comprise: instructions that cause the one or more processors to obtain one or more three-dimensional shapes of a part of the subject; instructions that cause the one or more processors to segment the part into a plurality of patches; instructions that cause the one or more processors to determine a local shape subspace, the local shape subspace including a plurality of deformation shapes for each patch of the plurality of patches, wherein a deformation shape of a patch defines a deformation of the patch for an observed shape of the part; instructions that cause the one or more processors to determine an anatomical subspace, the anatomical subspace including a rigid structure constraining each of the plurality of patches; and instructions that cause the one or more processors to generate the anatomically-constrained model of the part by combining the local shape subspace and the anatomical subspace.

In some embodiments, determining the local shape subspace includes determining the plurality of deformation shapes by removing rigid motion from the obtained one or more three-dimensional shapes. In some embodiments, determining the local shape subspace includes: aligning a deformed patch of an obtained three-dimensional shape of the part with a corresponding neutral patch of a neutral shape of the patch to obtain an aligned patch; and subtracting the neutral shape of the corresponding neutral patch from the aligned patch to obtain a deformation shape for the deformed patch.

In some embodiments, the rigid structure constrains deformation and movement of each of the plurality of patches.

In some embodiments, the method, system, and computer-readable memory described above for generating an anatomically-constrained model of a subject may further include performing performance tracking of the subject using the anatomically-constrained model of the subject. In some cases, the performance tracking is performed using input from a single camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures:

FIG. 1 illustrates an example of a system for generating an anatomically-constrained local face model, in accordance with an embodiment of the present invention.

FIG. 7B illustrates an example of a process of generating an anatomically-constrained model of a subject, in accordance with one embodiment of the present invention.

FIG. 15 illustrates results of the local face model fitting technique using consumer-grade cameras.

DETAILED DESCRIPTION

Figure 2A:
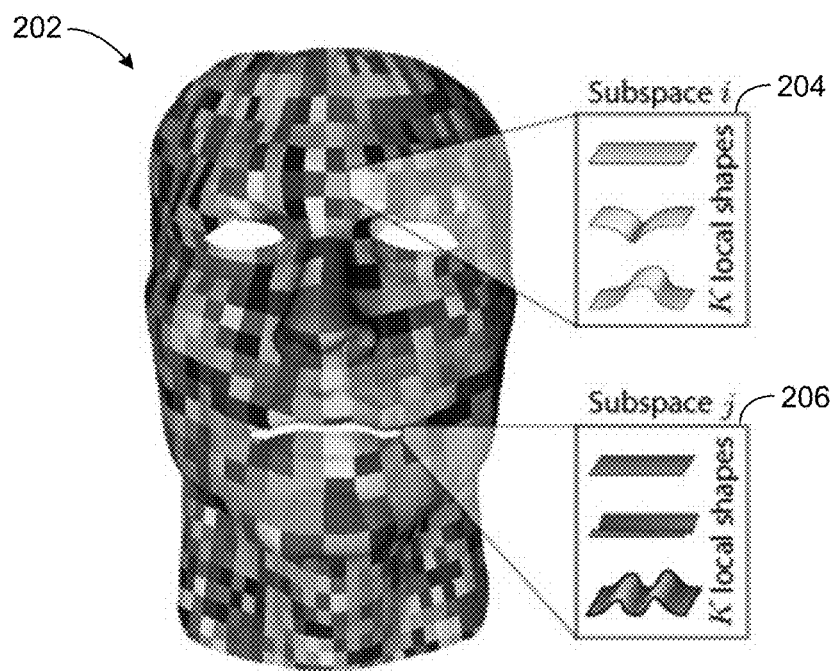
FIG. 2A-FIG. 2B illustrate an example of an anatomically-constrained local face model, in accordance with an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Facial performance capture techniques for tracking facial features of a subject are used for visual effects in media works, such as feature films, computer games, or other media works. A subject may include an actor, an animal, or other character that will be included in a media work. The facial performance capture area has attracted a lot of attention from the research community and has evolved rapidly. Researchers strive to acquire the face in more detail to provide higher quality face shapes and dynamics, while also striving to use less-constrained acquisition setups that utilize less hardware and give the actor more freedom to perform. A convenient video input device includes a single camera. However, reconstruction from a single camera is a difficult undertaking. For example, monocular performance capture techniques using a single camera input can rely on prior knowledge of the face, such as in the form of a global blendshape rig. The use of a global blendshape rig is also considered the industry standard for facial performance capture, in which case an actor or other subject is captured in a constrained setup to produce a highly accurate rig that can be used to track the subject's performance. The desired performance can then be acquired with less-constrained input devices (e.g., marker-based helmet cameras or other input device), which drives the rig to obtain the final animation.

In some cases, global blendshape rigs can over-constrain the facial capture problem, for example, by requiring any new face shape to lie within the space spanned by the blendshapes included in the blendshape rig. In such cases, a large number of facial expressions must be acquired, processed, and encoded into the global rig in order to faithfully capture a subject's performance. For example, a production-quality global rig can contain in the order of a hundred carefully picked expressions, requiring substantial time of both the subject and the artists creating the rig. Even a production-quality global rig is unlikely to encode all shape variations of the subject's face, leading to the possibility that a subject's facial expressions during a performance may not be reconstructed. For example, facial shapes caused by external forces and secondary motion (e.g., wind, an object striking the subject's face, or other forces or motion), which are not typically observable in a constrained acquisition setup, but are present during under-constrained acquisition later on set during a performance. A consequence of this is that performance reconstruction may not hit every expression accurately and may even shift some of the error into the head pose estimation, leading to unstabilized results.

To alleviate the problem of unstabilized results due to a mismatch in blendshapes of a rig and observed expressions during a performance, head pose and expression fitting may be separated by first estimating the head pose in an often manually assisted stabilization pass before solving for the expression using the rig. Manual stabilization is a tedious and time consuming process, and even if solved correctly, global blendshapes are typically not able to fit the expressions accurately.

Local blendshape rigs add flexibility and allow facial capture techniques to express global shapes outside of the pre-captured set of blendshapes. However, local blendshape rigs come at the price of reduced robustness. For example, a skin patch can appear bigger on a display screen, which can either be due to local stretch or because the patch moved towards the camera, or a combination of both. These ambiguities have so far prevented the use of highly localized blendshapes for performance capture (e.g., monocular performance capture, helmet-camera performance capture, or other suitable performance capture).

A local subspace face model is described herein that models local deformation of different segments of the face (referred to herein as patches). Traditional global and local rigs represent the position of the facial features as an expression is performed. A subject's skin (or other soft or non-rigid tissue) in a local neighborhood deforms in a small number of ways (e.g., wrinkle, stretch, and/or squeeze). In contrast, the face can globally do much more. For example, a subject can open the mouth, pucker, smile, frown, furrow the brow, open eyes wide, close eyes, along with numerous other expressions. The skin or other soft tissue is thus better constrained, and the local subspace model represents deformation of local patches on the face. Due to the limited number of ways the skin or tissue can locally deform, the local subspace model has many less expression samples than a global blendshape rig. For example, less than a dozen (e.g., 5, 6, 7, 8, 9, 10, or other suitable number) of expressions may be obtained to build the local subspace model. The local deformation shapes of the different patches modeled by local subspace model can be combined to achieve more expression shapes than can be achieved using traditional global and local rigs, while constraining the deformation to the shapes in the local subspace model.

The local subspace model described herein also increases robustness over traditional localized blendshape rigs by using an anatomical subspace with anatomical constraints. A robust model maintains the shape of a face and prevents abnormal face shapes. The local subspace model leverages the fact that the underlying bone structures of the face (or other rigid structure supporting a non-rigid surface of a subject) move rigidly and that tissue thickness of the face is directly related to local surface structure of the face. By globally linking local shape subspaces to the underlying bone, a robust local subspace face model is achieved that is anatomically-constrained while maintaining flexibility and expressiveness. The anatomically-constrained local subspace model is bounded by anatomical constraints, making it robust to typical ambiguities that occur with local models.

Facial performance capture techniques are also described herein that use the anatomically-constrained local subspace model to automatically reconstruct both the face surface and the underlying skull, obtaining rigidly stabilized facial performances. In some embodiments, the facial performance capture techniques can be performed from just a single camera view, thus achieving monocular face capture with high-quality results. For example, facial performances can be reconstructed in very high quality from a single view, with automatic rigid stabilization. The facial performance capture techniques can incorporate dense constraints (e.g., provided from optical flow, or other process) and/or sparse constraints (e.g., provided by physical marker tracks on the subject, artist sketches, or the like).

The anatomically-constrained local subspace face model and capture approach described herein can be used to track three-dimensional (3D) faces from motion data in a high-quality manner. In contrast to traditional global face models, often built from a large set of blendshapes, the local subspace face model is composed of many small subspaces spatially distributed over the face. For example, the local subspace model compactly represents the subject-specific prior as a dense set of local subspaces, derived from a minimum set of facial scans. The local subspace model offers far more flexibility and expressiveness than global models, even with a much smaller model size. The flexibility of a local model typically comes at the cost of reduced robustness (as described above), such as during the under-constrained task of monocular reconstruction. However, the anatomical subspace considers the face anatomy (in terms of bone structure) and introduces subspace skin or other tissue thickness constraints into the model that constrain the face to only valid expressions and resolves local model ambiguity. The constraints also counteract depth ambiguities in monocular tracking using a single camera.

Given the anatomically-constrained local subspace model, a facial performance fitting optimization allows 3D facial performance reconstruction (e.g., from a single view or using multiple cameras) at extremely high quality that exceeds traditional global fitting approaches. The model is flexible, and can also be applied in situations where only sparse motion data is available (e.g., in the application of marker-based motion capture or face posing from artistic sketches). Furthermore, by incorporating anatomical constraints, the model can automatically estimate the rigid motion of the skull, obtaining a rigid stabilization of the head during the performance without an extra rigid stabilization step. For example, the underlying bone structure (or other rigid structure) can be used to anatomically constrain the local skin or other tissue thickness, and as a result, the techniques herein can simultaneously solve for the skin surface and the skull position for every video frame, yielding a rigidly stabilized performance.

In some embodiments, an importance ranking of typically-acquired face shapes for model or rig creation is provided. For example, the ranking can inform the minimum number of shapes required for high-quality facial performance capture. By picking the right shapes, the facial performance capture techniques require significantly less expressions to be pre-acquired than traditional global blendshape tracking.

Other methods exist that create models of faces for the application of face tracking. For example, some techniques perform multi-view face capture, which leverage computer vision concepts like stereo reconstruction to acquire the facial geometry from multiple views. Another example includes monocular face capture, in which case detailed and dense facial performances are reconstructed from a single camera view. Monocular face capture eases the hardware burden of multi-view capture methods and provides solutions for home users (e.g., using a handheld camera, such as on a digital camera, a mobile device, or other handheld device). Parametric face models that parameterize the face as a 2D or 3D face model is a common way to overcome the ambiguities associated with monocular face tracking. Some common models include Active Appearance Models (AAM), blendshapes, principle components analysis (PCA) on a set of training shapes, morphable models, and multilinear models. A drawback of these models is that they are designed to be global, meaning that the entire face is parameterized holistically, which limits local expressiveness unless the model is very large with an excessive number of prior samples.

Local or region-based models have also been proposed, which offer flexibility at the cost of being less constrained to realistic human face shapes. For example, local models may use many localized multilinear models to reconstruct faces from noisy or occluded point cloud data. The local subspace model described herein is a 3D face model that parameterizes the face into many overlapping patch subspaces. Rather than traditional region-based blendshape models that encode both local and global deformation for each region, the local subspace model has many local subspaces that can encode only the local deformation, while global motion is handled using a tracking optimization step. In order to make the local subspace model tractable and robust, the anatomical constraints can be used, and the local skin or other soft tissue thickness is also parameterized in the subspace. The resulting model maintains the flexibility and expressiveness of local models, but with highly-increased robustness due to the anatomical constraints, allowing face reconstruction and editing (e.g., monocular or multi-view face reconstruction and single-view or multi-view direct editing) with unprecedented fidelity, even during extreme local deformations and without being susceptible to depth ambiguities.

FIG. 1 illustrates an example of a system for generating an anatomically-constrained local subspace face model using a model generator 104. The anatomically-constrained local subspace face model may be referred to herein as the local face model. The local face model generated by the model generator 104 includes a local patch shape subspace and an anatomical subspace including an underlying anatomical bone structure (or other rigid structure in cases where a non-human or fictional character is being modeled). For the local shape subspace, the face geometry is represented with overlapping patches. FIG. 2A illustrates an example of a computer-generated representation of a subject's face 200 segmented into multiple patches. In some cases, one or more of the patches may not be overlapping. The local deformation of each patch is constrained by a local shape subspace for each patch. The local shape subspace is learned from a set of training shapes, and the global motion of each patch is defined by a rigid transformation. For each patch i, parameters are defined including the rigid transformation denoted as a matrix $M_i$, and the local shape subspace coefficients $\alpha_i$. The anatomical subspace component can be modeled as an actor-specific skull and jaw bone. One of ordinary skill in the art will appreciate that other bones in the face may also be used in the anatomical subspace. In one example, a generic skull can be fit to the subject, and the jaw can be modeled by a computer program or an artist. For example, the model generator 104 (e.g., the anatomical subspace engine 110) can obtain or access a generic skull mesh, identify a few key points on the skull, mark corresponding points on the subject's face mesh with specified skin or other tissue thicknesses, and then deform the skull mesh using any suitable mesh deformation technique (e.g., a Laplacian Deformation) so that the key points correspond with the specified skin or tissue thickness, and so that the skull does not penetrate through the face mesh at any location.

Figure 2B:
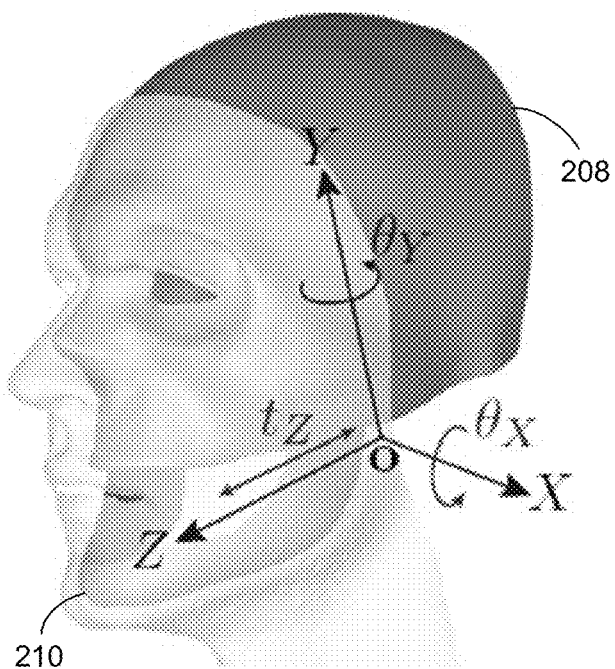

FIG. 2B illustrates an example of a computer-generated representation of an anatomical bone structure of a subject's face, including a skull 208 and a jawbone 210. The skull motion is defined by a rigid transformation matrix $M_s$. The jaw motion is linked to the skull 208 via a pivot point, o, represented as a joint with two degrees of freedom for rotation θ and one degree of freedom for translation t. The jaw motion is denoted as a jaw motion parameter $\Theta = \{\theta_x, \theta_y, t_z\}$. In some portions of the description, the global rigid motion $M_j$ of the jaw may be referred to explicitly, which can be computed as $M_s \cdot M(\Theta)$, where MO computes the transformation matrix corresponding to Θ.

A model generator 104 can include a processor, memory, and program code that resides in the memory and executed by the processor. The program code can include multiple engines that enable the processor to create the local face model. For example, the model generator 104 includes a facial segmentation engine 106, a local shape subspace engine 108, an anatomical subspace engine 110, and a subspace combining engine 112. The facial segmentation engine 106 can obtain or access one or more 3D shapes (defined by facial expressions) of a subject's face. The subject can be an actor, an animal, or any other subject upon which facial performance capture or tracking is to be performed. The 3D face shapes can be provided by a 3D face shapes database 102 or other storage that stores data including various 3D face shapes of one or more subjects. In some examples, the 3D face shapes database 102 can be separate from the model generator 104, such as a separate database or storage device. In some examples, the 3D face shapes database 102 can be included in the same device as the model generator 104.

Before defining the local shape subspace, the facial segmentation engine 106 obtains a 3D face shape of the subject, and segments the subject's face into patches, as shown in FIG. 2A. In some embodiments, the patch segmentation can be semantically meaningful, exploiting the physical properties and motion of the skin (e.g. following flow lines on the face). In some embodiments, the patches may be defined using a uniform segmentation across the face. For example, a uniform segmentation in the UV space of the face may be used to define the patches. One of ordinary skill in the art will appreciate that any other patch segmentation can be used. Because the deformation of each patch is also influenced by neighboring patches, the segmented patches are defined to overlap with their neighbors. The overlapping of the patches can be achieved by first performing a non-overlapping segmentation (as shown in FIG. 2A) and then dilating each patch by a fixed amount (e.g., 5%, 10%, 15%, 20%, or any other suitable amount in each direction). To account for holes or concave boundaries in the UV plane, patches can be split if they contain disconnected regions, ensuring that each patch is a single connected region. The number N of patches to create (or equivalently the patch size) can be a user-defined parameter or an auto-generated parameter. An evaluation of different patch sizes will be discussed further below.

Once the subject's face is segmented into patches, the local shape subspace engine 108 can determine the local shape subspace (also referred to as the local skin deformation subspace) for the patches. For example, the local shape subspace engine 108 can determine a local shape subspace 204 for patch i, a local shape subspace 206 for patch j, and a local shape subspace for any other patch on the subject's face. To obtain the local skin deformation subspace, the subject-specific deformation is captured for each patch in correspondence. As used herein, meshes (e.g., patches) in correspondence refers to the meshes for the expressions having the same (or in some cases similar) number of vertices and vertex ordering, which defines an explicit correspondence between the vertices. Additionally, corresponding vertices in the different meshes can represent the same point on the face. In one example of capturing a sub-specific deformation for each patch, a neutral scan of the subject's face and a set of K facial expressions are captured and reconstructed using any suitable performance capture method. Determination of the K facial expressions is discussed in more detail below. From these tracked face reconstructions, the local deformation subspace can be extracted. For example, given several shapes in correspondence, the neutral mesh is segmented into N patches, as described above. A K+1 shape subspace (corresponding to the facial expressions plus the neutral expression) is then built for each patch by first aligning the K patch shapes to corresponding neutral patch shapes in the neutral mesh. In one example, the K patch shapes are aligned to the corresponding neutral patch shapes using Procrustes alignment. One of ordinary skill in the art will appreciate that any alignment technique may be used to minimize the center of mass of the patches being aligned. The neutral patches are then subtracted from the aligned patches to obtain a deformation shape (or component) for each expression. The deformation component represents the difference between a deformed patch from one of the K facial expression and a corresponding neutral patch from the neutral expression. By subtracting out the neutral patches, the rigid motion is removed and the non-rigid deformation of the patches remains. The resulting subspace for a patch i, for example, includes the neutral shape $U_i$ and K deformation components $\{D_i^1, \ldots, D_i^K\}$. A deformation component may also be referred to herein as a deformation shape. A patch can then be reconstructed during performance tracking as a linear combination of the deformation components. For example, the deformed patch shape at time t can be computed as:

$$X_i(t) = M_i(t)\left(U_i + \sum_{k=1}^{K} \alpha_i^k(t) D_i^k\right), \quad (1)$$

where $M_i(t)$ is the rigid motion of the patch and $\alpha_i^1(t), \ldots \alpha_i^K(t)$ are the coefficients of the deformation components $\{D_i^1, \ldots, D_i^K\}$. In one example, if a patch i is flat in one expression and bulgy in another expression, any deformation can be reconstructed for the patch i between the flat shape and the bulgy shape using different coefficients α for the deformation components $\{D_i^1, \ldots, D_i^K\}$. The number and description of the K expressions used to build an local shape subspace can be adjusted to achieve different results. As discussed further below, the local face model needs far fewer training expressions than typical global models. Also discussed below is a technique for ranking the importance of different expressions to achieve high-quality reconstructions using the local face model.

Exploiting the local deformation of a patch is physically more intuitive than a holistic approach (as used by traditional global models) and is also practically more expressive in terms of deformations that can be represented. As previously discussed, fitting a local model to real world data can be more ill-posed than a global model due to the larger set of parameters to estimate, and thus can be more vulnerable to noise and outliers and can suffer from depth ambiguities. The anatomical subspace engine 110 can generate or determine an anatomical subspace to add robustness to the local face model. Considering the specific anatomical structure of a face, the anatomical skull and jawbone are used by the anatomical subspace engine 110 to constrain the patches globally on the face so that deformation of the patches is jointly-constrained (using the local shape subspace and anatomical constraints) to be physically feasible. The anatomical bone structure is shown in FIG. 2B, and the motion is described by the rigid motion of the underlying bones, which is denoted herein as $M_b$ to mean either $M_s$ when referring to the skull or $M_j$ when referring to the jaw.

To employ the anatomical structure to constrain the patch motion, a link is established between the skin surface and the anatomical bones. The two parts are linked by modeling the behavior of the underlying soft tissue in-between the skin surface and the bones. As skin compresses, it will bulge out away from the bone to preserve the volume of the underlying tissue, increasing the distance between the skin surface and the bone. Similarly, as skin stretches, the skin will move closer to the bone to preserve the volume, decreasing the distance between the skin surface and the bone.

Tissue volume preservation is incorporated into the local subspace face model for patches, with the goal of predicting how a patch moves relative to the bone given a current local deformation of the patch. To incorporate volume preservation of the tissue, the local subspace of the model is expanded beyond a shape basis to also include the skin and underlying tissue thickness for each subspace shape of each patch. While a bone structure is used herein as an example, one of ordinary skill in the art will appreciate the techniques disclosed herein apply to other rigid structures of a subject that may be used, such as an artificial structure of a non-human or fictional subject being modeled that may not include actual bones. Furthermore, while the term skin is used herein as an example, one of ordinary skill in the art will appreciate the techniques disclosed herein apply to other surfaces of a subject that may be used, such as an artificial surface of a non-human or fictional subject being modeled that may not include actual skin.

The thickness of the skin tissue (or other non-rigid or soft tissue) is expressed within the patch as a single value $d_v$, at a vertex v close to the center of the patch. Selecting an actual vertex as a reference point instead of the patch centroid is advantageous during the optimization described below due to the position $x_v$ of the vertex lying on the surface. Computation of the skin thickness for the subspace is not trivial. For example, as a patch deforms, it typically slides over the bone, and thus shape-specific projections from the patch to the bone are accounted for in order to compute the distance from the skin to the bone. Furthermore, when the patch deforms, the normal at v typically changes and is thus not a temporally stable direction to compute the distance along. Since the skull and jaw are relatively smooth and consistently rigid, one approach is to use the inverse of the bone normal to compute the projection or distance. However, in some cases, this approach can introduce a problem since the bone point that corresponds to v may not be known before projecting.

Figure 3A:
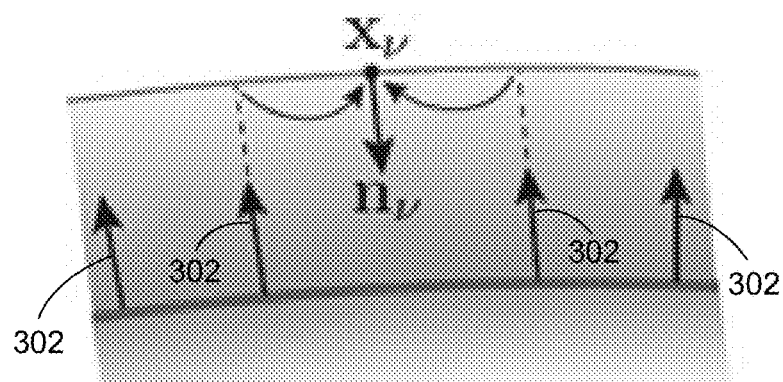
FIG. 3A-FIG. 3C illustrate an example computation of an anatomical subspace of an anatomically-constrained local face model, in accordance with an embodiment of the present invention.
Figure 3B:
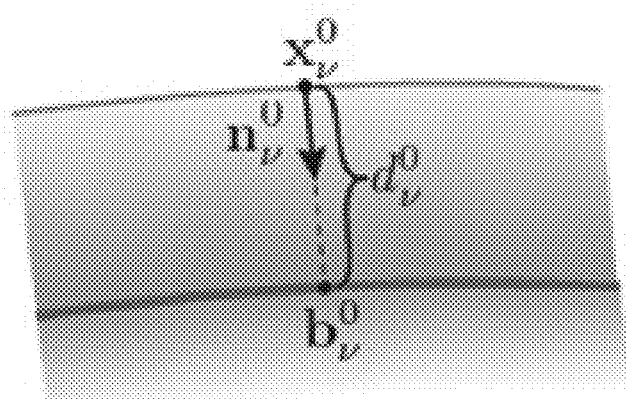
Figure 3C:
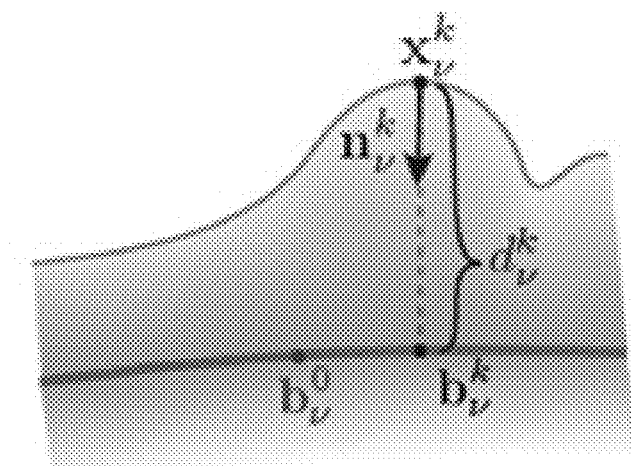

FIG. 3A-FIG. 3C illustrate a technique for computing the skin thickness for the anatomical subspace. As illustrated in FIG. 3A, a point $x_v$ at the center of a patch is related to the underlying bone through a skin thickness constraint $d_v^k$ for each shape of the subspace. The direction $n_v$ in which to measure the thickness is computed by interpolating back-projected normals 302 from bone to skin. For example, the normals 302 are projected backwards from all the vertices of the bone to the patch. The inverse bone normals at the vertex v are then interpolated. For example, linear interpolation may be performed using the defined nearby normals 302. One of ordinary skill in the art will appreciate that any other interpolation, estimation, or combining technique may be used to determine the inverse bone normal using the nearby normal 302. The interpolated normal $n_v$ provides the direction to cast a ray that intersects with the bone at a point denoted by $b_v$, yielding the skin thickness $d_v = \|b_v - x_v\|$. As shown in FIG. 3B, a ray is projected from the position of the vertex $x_v^0$ in the direction of the interpolated normal $n_v^0$, and intersects the bone at the point $b_v^0$ to give the skin thickness distance $d_v^0$. As shown in FIG. 3C, the technique is repeated for all shapes in the subspace to compute skin thicknesses $d_v^k$ for the patch.

To compute an estimate $\tilde{x}_v$ of the vertex position of a patch later on during reconstruction, bone points $b_v^k$ and normal directions $n_v^k$ are additionally stored for each shape k in the local subspace for the patch. These quantities are represented in the coordinate frame $M_b^k$ of the underlying bone, which removes any rigid motion and renders the quantities of the bone points and normal directions compatible. Some patches (e.g., patches on the cheek or other area of the face), do not have an underlying bone and are thus not anatomically constrained.

For any time t, the position $\tilde{x}_v(t)$ of vertex v can be predicted as:

$$\tilde{x}_v = M_b(t)(\tilde{b}_v(t) - \tilde{d}_v(t)\tilde{n}_v(t)), \qquad (2)$$

Where $\tilde{b}_v(t)$, and $\tilde{n}_v(t)$, and $\tilde{d}_v(t)$ are computed as:

$$\tilde{b}_v(t) = b_v^o + \sum_{k=1}^{K} \alpha_i^k(t)(b_v^k - b_v^0), \qquad (3)$$

$$\tilde{n}_v(t) \cong n_v^o + \sum_{k=1}^{K} \alpha_i^k(t)(n_v^k - n_v^0), \qquad (4)$$

$$\tilde{d}_v(t) = d_v^o + \sum_{k=1}^{K} \alpha_i^k(t)(d_v^k - d_v^0), \qquad (5)$$

The estimated skull point $\tilde{b}_v(t)$ and the skull normal $\tilde{n}_v(t)$ are approximations. The approximation is appropriate due to the underlying skull varying only smoothly in-between the samples so that the introduced inaccuracy is negligible, especially considering that the underlying skull is an estimation. The benefit of using the approximate formulation is that the problem can be cast as a system of linear equations, which can be solved uniquely and efficiently as discussed below with respect to the local tracking.

The subspace combining engine 112 can combine the local shape subspace and the anatomical subspace. For example, the local shape subspace and the anatomical subspace can be combined into a common dataset. The combination of local shape subspace plus the anatomical subspace makes up the local face model. In some embodiments, the local shape subspace and the anatomical subspace are kept as separate data sets that can be used together in a facial tracking process.

Figure 4:
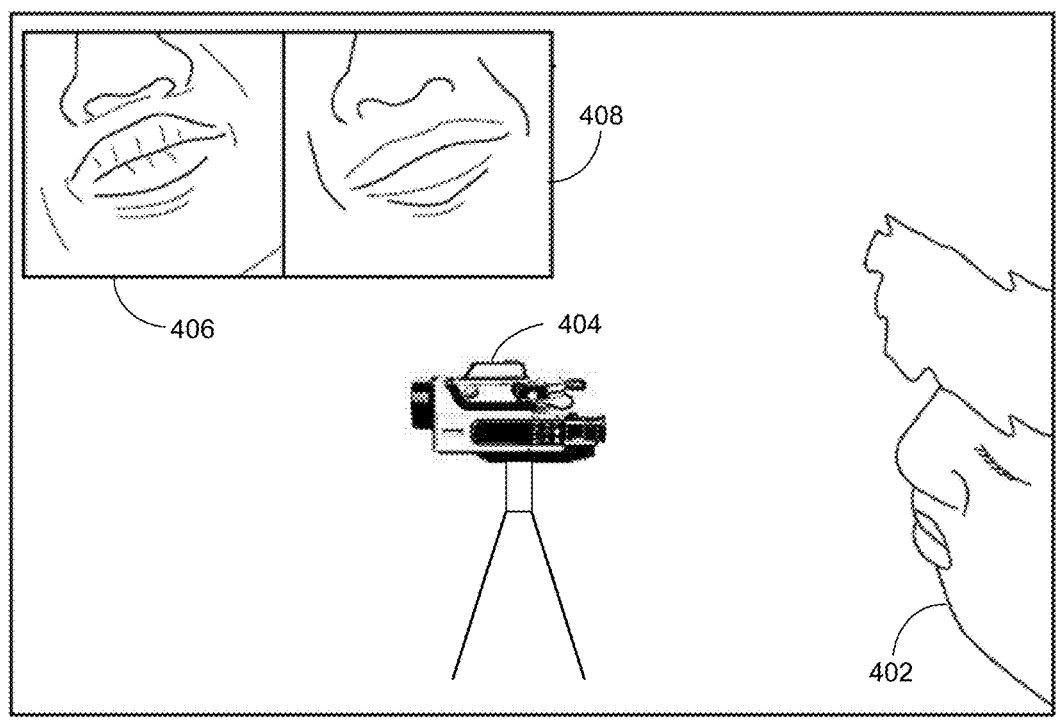
FIG. 4 illustrates an example of an environment including a system for capturing images of a subject and performing facial performance tracking using motion data, in accordance with an embodiment of the present invention.

The local face model can then be used for facial motion reconstruction, given an initial face mesh and either sparse or dense 3D or two-dimensional (2D) motion data. FIG. 4 shows an example of an environment including a system set-up for capturing images of a subject 402 and performing facial performance capture (or tracking). 2D or 3D motion data may be determined from the images. Motion data may also be determined from markers attached to the face of the subject 402, from an illustration drawn or otherwise created by an artist, or from another suitable source. In some examples, the local face model can be fit to the real 2D or 3D motion data from a single point of view (e.g., from a camera view of a camera 404, from marker data, or from an illustration from an artist), in which case monocular face capture may be performed. In some cases, the motion data may be obtained from multiple points of views (e.g., multiple cameras, marker data, or an illustration), in which case multi-view face capture may be performed. Using the set-up shown in FIG. 4, the subject may make a facial expression 406 that is captured in an image from the camera 404. Motion data may be determined from the image using, for example, optical flow techniques. Using the motion data, the facial performance capture program running on one or more processors of a computer may perform the techniques described in further detail below to render the output 408 including a reconstructed representation of the subject's facial expression. As described further below, the facial motion reconstruction can be performed in two steps, first by tracking the local patches and bones using the anatomical constraints, and then by combining the patches into a global face mesh.

Figure 5:
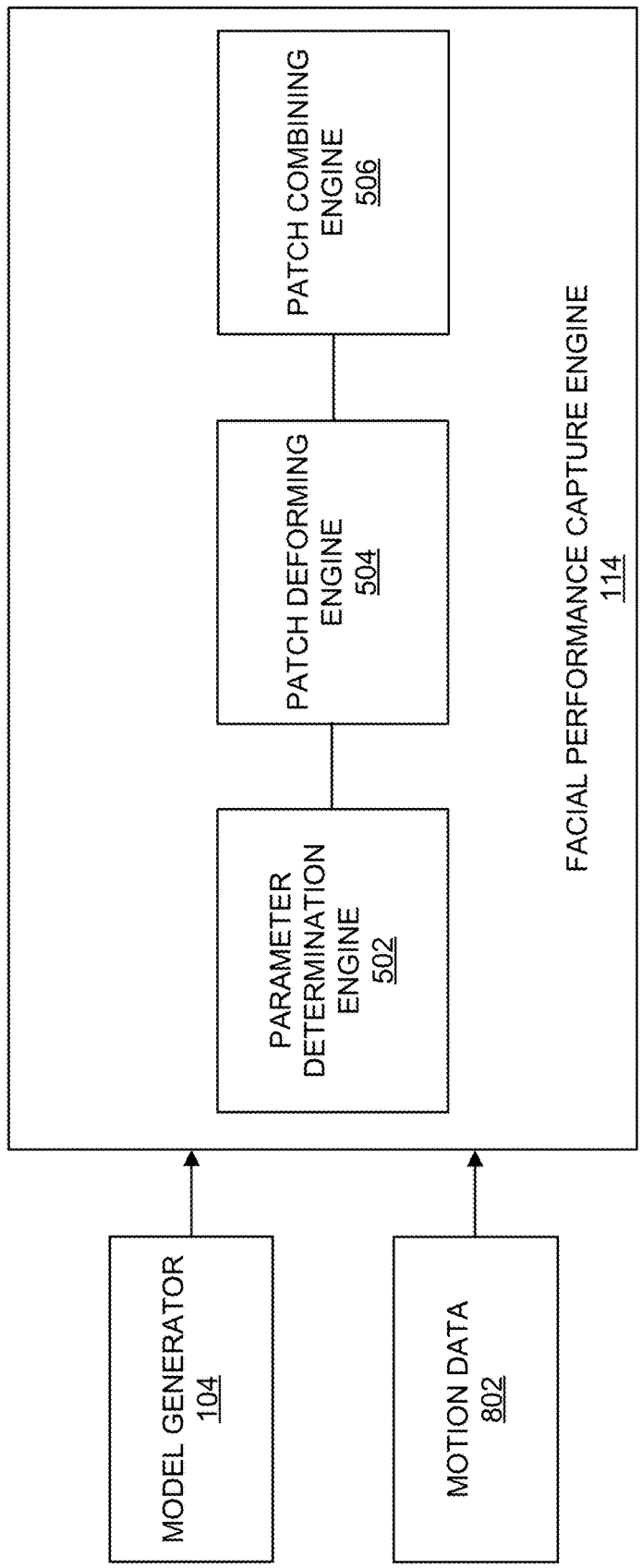
FIG. 5 illustrates an example of a system for performing facial performance tracking using an anatomically-constrained model, in accordance with an embodiment of the present invention.

FIG. 5 illustrates an example of a system for performing facial performance tracking. The system includes the facial performance capture engine 114 that performs a new technique for 3D face tracking using the anatomically-constrained local face model described herein. In some embodiments, the facial performance capture engine 114 can obtain or access the anatomically-constrained local face model from the model generator 104. In some embodiments, the local face model can be obtained or accessed from a memory, a database, or other storage.

The facial performance capture engine 114 can also obtain or access motion data of the subject's face from a motion data database 802. In some examples, the motion data database 802 can be separate from the facial performance capture engine 114, such as a separate database or other storage device. In some examples, the motion data database 102 can be included in the same device as the facial performance capture engine 114. In some examples, an image capture device can capture images, and motion data may be determined from the captured images (e.g., using optical flow techniques). The image capture device can include a production-quality camera, a camera available in a consumer device, such as a smartphone or other portable or mobile device, a digital camera, a head-mounted camera, or any other suitable camera. In some examples, the motion data can be determined from marker data (with a single view or multi-views) or from an artist's illustration (with a single view or multi-views) of the subject's face. The face tracking technique can be designed for multi-view facial performance capture from multiple views, for single-view monocular facial performance capture from a single view, or for other applications for which 2D or 3D motion prediction is available. For example, the image capture device includes a single camera for monocular facial performance capture. In another example, the image capture device includes multiple cameras for multi-view facial performance capture.

A goal of the local model-based capture, fitting, or reconstruction technique is to estimate the local face model parameters that best describe the observed motion under the given constraints through optimization. The parameter determination engine 502 is used to determine the parameters of the local face model that are faithful to the local shape subspace of the patches and also faithful to the motion data that is observed at a given point in time. Unknowns to solve for include (a) the rigid local patch motion $\{M_i\}$, (b) the local patch deformation, including the local blend coefficients $\{\alpha_{ij}\}$; and c) the rigid motion of the anatomical bones, including skull motion $M_s$ and jaw motion $\Theta$. The solution can be formulated as an energy minimization problem for each frame t:

$$\underset{\{M_i\},\{\alpha_{ij}\},M_s,\Theta}{\text{minimize}} E(t), \qquad (6)$$

where the energy E (t) contains several terms, and is defined as:

$$E(t)=E_M(t)+E_O(t)+E_A+E_T(t). \qquad (7)$$

The term $E_m$ is the 2D motion energy term or constraint, and includes the main data term that considers the input 2D motion vectors. The 2D motion vectors may be determined using optical flow techniques. An example of optical flow is described in Brox et al., *High Accuracy Optical Flow Estimation Based on a Theory for Warping*, ECCV, Springer, 25-36 (2004). For example, using two images as input, an optical flow algorithm may find dense correspondences from the first image to the second image. The flow from one camera image to another camera image may be computed. Therefore, optical flow may be used to find correspondences of facial features between the different captured images. The term $E_O$ is referred to as the overlap constraint, which is a spatial regularization term to enforce neighboring patches to agree with each other wherever they have shared vertices. The term $E_A$ is the anatomical constraint, which ensures that patches remain plausibly connected with the bone structure. The term $E_T$ is a temporal regularization term, which ensures smooth change over time. The patches can be solved for in a coupled way. However, the result is a set of disjoint patches that are to be combined into a single global face mesh, which is described in further detail below.

As previously noted, the term $E_m$ is the motion energy term. Some embodiments herein include monocular facial performance capture, which can be an ill-posed problem due to the fact that the depth information is missing from the 2D motion data. In order to estimate a 3D face out of 2D input, some form of prior is needed. In traditional systems, a blendshape subspace is typically used. The techniques described herein make use of the local shape subspace of the local face model to constrain the deformation of the patches to that subspace, while attempting to match the projected 2D motion as closely as possible. Given a face mesh observed from a single view, let V(t) be the set of visible vertices and $p_v(t)$ be the predicted 2D pixel location corresponding to vertex v∈V at time t, and let Q be the calibrated projection matrix, then the motion energy term is defined as:

$$E_M(t) = \lambda_M \sum_{v \in V(t)} \sum_{i \in \Omega(v)} \psi(\|Q(x_{v,i}(t)) - p_v(t)\|), \tag{8}$$

where $x_{v,i}(t)$ is the unknown 3D position of vertex v in patch i expressed in the form of Equation 1 above via the unknown blend coefficients $\alpha_i$ and the unknown rigid transformation $M_i$, and $\Omega(v)$ is the set of patches which contain vertex v. $\lambda_m$ is a weighting factor for the motion energy term, and $\psi(\bullet)$ is a robust kernel used to reduce the impact of outliers, and takes the form:

$$\psi(e) \; \min_w \; (w^2 e^2 + 2(1-w^2)^2). \tag{9}$$

The kernel function reduces outliers because it is a function of e, which starts off rather linear and then flattens out as e gets bigger. For example, if the projected pixel and the predicted pixel are too different (i.e. a large e value), then this indicates an outlier and this error is decreased using the kernel so that the optimization does not focus on reducing that particular error. One of ordinary skill in the art will appreciate that other suitable forms of a robust kernel can be used to reduce the impact of outliers. Note that the set of motion constrained vertices V depends on the type of input and can range from very dense for flow based performance capture to very sparse in the case of marker based motion capture using a motion capture (MoCap) suit.

The motion energy constraint $E_m$ is applied independently for each patch, meaning that overlapping patch boundaries may not agree and may not deform alike. The end result is construction of a single global mesh surface, which is easier if neighboring patches deform consistently and alike. To accomplish this, an overlap constraint $E_O$ is introduced that operates like a spatial regularizer to enforce neighboring patches to agree with each other wherever they have shared vertices. As a group of shared vertices is explicitly generated in the patch segmentation step, the overlapping constraint can be defined for these vertices, as follows:

$$E_O(t) = \lambda_o \sum_{v \in S} \sum_{(i,j) \in \Omega(v), i>j} \|x_{v,i}(t) - x_{v,j}(t)\|^2, \tag{10}$$

where S is the set of vertices shared by patches, and $\lambda_O$ is a weighting factor. By applying the overlapping constraint to neighboring patches, a smooth surface is provided across the patches.

With the motion energy constraint $E_m$ and the overlap constraint $E_O$ defined above, facial surface tracking would already be possible, however, as mentioned earlier, this more expressive local model may come at the cost of lower robustness. Therefore, the anatomical constraint $E_A$ is introduced into the energy to add robustness. The anatomical constraint $E_A$ contains two terms, one term $E_{A1}$ for constraining the patches given the bone structure, and one term $E_{A2}$ for predicting the rigid bone motion given the 2D motion data. The first term constrains patches using the sparse predicted point constraints $\tilde{x}_v(t)$ computed from the anatomical subspace in Equation 2, and is written as:

$$E_{A1}(t) = \lambda_{A1} \sum_{v \in A} \sum_{i \in \Omega(v)} w_v \|x_{v,i}(t) - \tilde{x}_v(t)\|^2, \tag{11}$$

where A is the set of vertices that contain anatomical constraints, and $\omega_v$ is a weighting factor. With the $E_{A1}$ term alone, the rigid motion of the anatomical bones can be obtained, as the predicted surface point is also indirectly constrained by the motion energy constraint $E_m$. In some cases, however, more stable bone tracking can be achieved by imposing the motion energy constraint $E_m$ directly on the predicted surface point $\tilde{x}_v$ in a second term, written as:

$$E_{A2}(t) = \lambda_{A2} \sum_{v \in A} \sum_{i \in \Omega(v)} w_v \psi(\|Q(\tilde{x}_v(t)) - p_v(t)\|), \tag{12}$$

where $\lambda(\bullet)$ is again the robust kernel from Equation 9. The final energy for the anatomical constraint $E_A$ is then:

$$E_A(t) = E_{A1}(t) + E_{A2}(t) \tag{13}$$

Adding the anatomical constraint $E_A$ significantly improves the depth reconstruction of the face, which we will be shown in the examples described below. As a by-product of using the anatomical constraint $E_A$, the anatomical bone tracking result can also be used to automatically estimate a rigid stabilization of the face sequence since rigid bone motion is predicted and thus the skull position is already solved for.

Due to noise in the input data (e.g. from optical flow computations), small errors in reconstruction can cause temporal flickering. This can be overcome by adding a temporal regularization term $E_T$, which includes two parts. The first part ensures that the head pose changes smoothly over time, and the second part ensures that the local face deformation changes smoothly over time. The local face model allows these temporal constraints to be easily formulated on a subset of the variables, including the anatomical bone motion and the local blend coefficients $\alpha_i$. For the skull, a constraint is imposed on the movement of the pivot point o (as shown in FIG. 2B). For the jaw motion and local deformation, the change of the jaw motion parameter $\Theta$ and the local deformation parameter $\alpha_i$ are directly minimized over time. The temporal regularization term is thus written as:

$$E_T(t) = \lambda_{T1} \|o(t) - o(t-1)\|^2 + \tag{14}$$
$$\lambda_{T2} \|\Theta(t) - \Theta(t-1)\|^2 + \lambda_{T3} \sum_{i=1}^{N} \|\alpha_i(t) - \alpha_i(t-1)\|^2.$$

In the case of the jaw, the magnitudes of the angular components expressed in radians and the translational component given in mm are compatible and therefore the terms can be used without reweighting.

The energy function E (t) is defined as a least squares problem, which can be solved by a Gauss-Newton solver using a Guass-Newton method. Due to the rotational components in {M}, $M_s$ and $\Theta$, the energy is non-linear. Therefore, the energy is linearized using a Taylor expansion and the analytical gradient is explicitly computed for each term. The Jacobian matrix is then computed for the normal equations in the Gauss-Newton solver. The rigid transformations can be represented as exponential maps, which work well for rigid tracking. As each patch is related only to its neighbors, the Jacobian matrix is very sparse. An Intel MKL library can be used to solve the sparse matrix to obtain a vector to update the current solution, which is iterated for $N_{iter}$ iterations.

One example of parameters that can be used for the local face model datasets include: $\lambda_M=1$, $\lambda_O=1$, $\lambda_{A1}=100$, $\lambda_{A2}=10000$, $\lambda_{T1}=40000$, $\lambda_{T2}=40000$, $\lambda_{T3}=400$, and $N_{iter}=12$. In the highspeed sequence shown in FIG. 16, the parameter $\lambda_{T3}=0$ because the local deformation of the real skin is very fast. An analysis of the number of patches N and the subspace size K to use is discussed further below. An example of such parameters includes N=1000 and K=9.

Figure 6A:
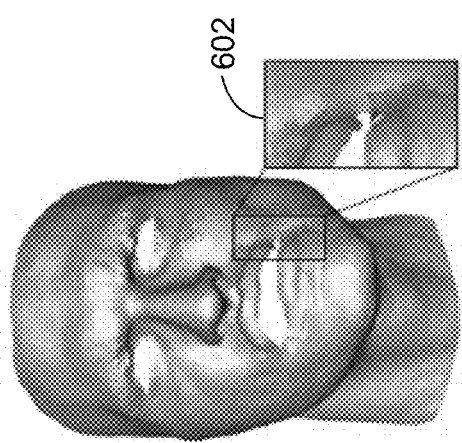
FIG. 6A-FIG. 6C illustrate examples of results of different patch blending techniques.
Figure 6B:
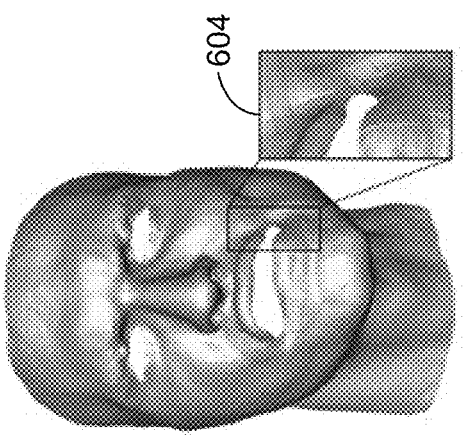

The result of the local tracking technique (single-view or multi-view) using the anatomically-constrained local subspace face model described above is a set of distinct local skin patches and the anatomical bone positions for each frame. For example, the local tracking technique provides an estimate of the reconstructed face, provided as a set of patches with local shape and global positions. The remaining step is to combine the patches into a single global face mesh using a global patch blending technique. The patch combining engine 506 can perform the global patch blending technique. As only a soft constraint is imposed on the overlapping patch boundaries, the shared vertices could have different position estimates from different patches. An example is shown for one frame in FIG. 6A, where the patches in box 602 are not connected. A single global face mesh is desired without disconnected patches. A naïve approach to combine the patches is to directly average the positions of vertices that belong to more than one patch, the results of which are shown in the box 604 of FIG. 6B. However, the naïve approach can result in visible seams between the patches.

Figure 6C:
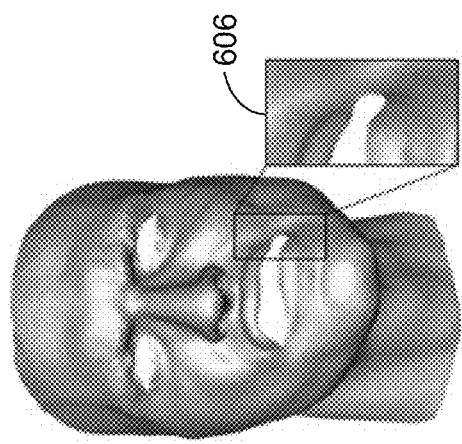

In order to obtain a seamless reconstruction that results in a single global face mesh with smooth boundaries, the global patch blending technique can blend all vertices (not just the ones that were in overlap regions). For example, a weighted averaging method can be performed, which gives higher influence to patches for which the vertex is geodesically closer to the center of the patch. Geodesic distance can be approximated by computing the shortest path along mesh edges. For example, for each vertex v, the approximate geodesic distance $\delta_{v,i}$ to the center of each patch i is computed, and then a weight for the patch is computed as:

$$w_{v,i} = \exp\left(\frac{-\delta_{v,i}^2}{\sigma_s^2}\right), \quad (15)$$

where $\sigma_s$ is the standard deviation of a Guassian kernel set to, for example, 1.6 times the average width of a patch. One of ordinary skill in the art will appreciate that other suitable multipliers may be used other than 1.6. After the weights from all the patches are computed, they are normalized to 1. With the normalized weights $\hat{w}_{v,i}$, the new position for vertex v is computed as:

$$\tilde{x}_v(t) = \sum_{i=1}^{N} \hat{w}_{v,i} x_{v,i}(t), \quad (16)$$

where $x_{v,i}(t)$ is the estimated position from patch i. The resulting global patch blend is shown in FIG. 6C. Computing the weights can be time-consuming since many geodesic paths must be traversed. In some cases, a weight is not computed for every patch, as the influence of patches becomes negligible after approximately $2\sigma_s$. In some cases, a weight can be computed for every patch, as the weights are only dependent on the mesh topology and the Gaussian kernel, which remain fixed for a given actor or other subject, and are thus computed only once. Once the weights are calculated, the patches are combined into a single global face mesh according to the calculated weights. The result is a combination of the patches stitched together in a smooth and continuous manner with little or no discontinuities between patches.

Figure 7A:
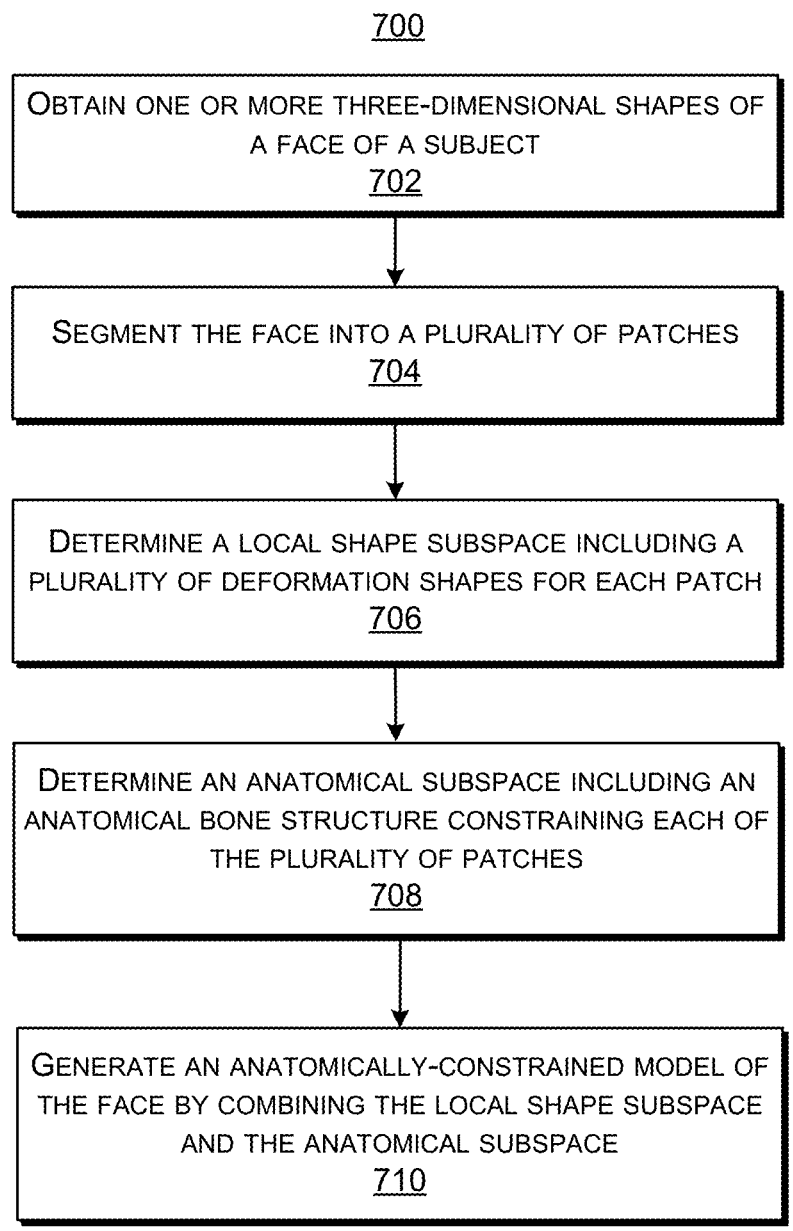
FIG. 7A illustrates an example of a process of generating an anatomically-constrained model of a face of a subject, in accordance with one embodiment of the present invention.

FIG. 7A illustrates an example of a process 700 of generating an anatomically-constrained local face model of a face of a subject. Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 700 may be performed by a computing device, such as the model generator 104 or the computing system 1900 implementing the model generator 104. For example, the computing system 1900 may operate the model generator 104 to perform the process 700.

At 702, the process 700 includes obtaining one or more three-dimensional (3D) shapes of the face of the subject. The 3D shapes represent an expression performed by the subject. At 704, the process 700 includes segmenting the subject's face into a plurality of patches. As described above with respect to FIG. 2A, the patches can be defined using a uniform segmentation across the face, or can be defined with reference to flow lines across the subjects face by taking into account physical properties and emotions of the subject. For example, a uniform segmentation in the UV space of the face may be used to define the patches. The segmented patches can be defined to overlap with neighboring patches, as the deformation of each patch is influenced by neighboring patches. In some cases, the patches can be overlapped by performing a non-overlapping segmentation, and then dilating each patch by a fixed amount (e.g., 5%, 10%, 15%, 20%, or any other suitable amount in each direction). In some aspects, patches can be split if they contain disconnected regions, ensuring that each patch is a single connected region. Splitting the patches can account for holes or concave boundaries in the UV plane. The number N of patches to create (or the patch size) can be a user-defined parameter or an auto-generated parameter, which is discussed further below.

At 706, the process 700 includes determining a local shape subspace. The local shape subspace includes a plurality of deformation shapes or components for each patch of the plurality of patches. For example, the local shape subspace of a patch includes a plurality of deformation shapes for that patch. A deformation shape of a patch defines a deformation of the patch for a facial expression. Determining the local shape subspace can include determining the plurality of deformation shapes by removing rigid motion from facial expressions included in the obtained one or more three-dimensional shapes. For example, the process 700 can include aligning a deformed patch of a facial expression in an obtained three-dimensional shape with a corresponding neutral patch of a neutral facial expression to obtain an aligned patch. The process 700 can further include subtracting a shape of the corresponding neutral patch from the aligned patch to obtain a deformation shape for the deformed patch. This process can be repeated for each different facial expression to determine the plurality of deformation shapes for the patch that correspond to the different facial expressions. A similar process can be repeated for the other patches to obtain the deformation shapes corresponding to the different facial expressions. For example, for a single patch, the process 700 can go through all expressions and build up the local shape space for that patch. The process 700 can then take another patch and go through all expressions again. In another example, the process 700 can make a single pass through the expressions, and can simultaneously build up the shape spaces of all patches at once.

For example, as described above, the local shape subspace (also referred to as the local skin deformation subspace) for the patches can be determined once the subject's face is segmented into patches. As shown in FIG. 2A, a local shape subspace 204 can be determined for patch i and a local shape subspace 206 can be determined for patch j. To obtain the local shape (or skin deformation) subspace, the subject-specific deformation is captured for each patch in correspondence. A neutral scan of the subject's face and the set of K facial expressions are captured and reconstructed using any suitable performance capture method. From these tracked face reconstructions, the local deformation subspace can be extracted. For example, as described previously, the neutral mesh is segmented into N patches. A K+1 shape subspace is then built for each patch by first aligning the K patch shapes to corresponding neutral patch shapes in the neutral mesh (e.g., using Procrustes alignment, or other suitable alignment technique used to minimize the center of mass of the patches being aligned). The neutral patches are subtracted from the aligned patches to obtain a deformation component for each expression. The deformation component represents the difference between a deformed patch from one of the K facial expression and a corresponding neutral patch from the neutral expression. By subtracting out the neutral patches, the rigid motion is removed and the non-rigid deformation of the patches remains. The resulting subspace for a patch i, for example, includes the neutral shape $U_i$ and K deformation components $\{D_i^1, \ldots, D_i^K\}$. The local shape subspace for a patch i can thus include a plurality of deformation components $D_i$ (also referred to as deformation shapes). A patch can then be reconstructed during performance tracking as a linear combination of the deformation components according to local blend coefficients, as shown in Equation 1.

At 708, the process 700 includes determining an anatomical subspace. The anatomical subspace includes an anatomical bone structure constraining each of the plurality of patches. For example, the anatomical bone structure constrains deformation and movement of each of the plurality of patches. In some examples, the anatomical bone structure can include a skull, a jawbone, or both the skull and the jawbone. One example of the anatomical bone structure is shown in FIG. 2B. The motion is described by the rigid motion of the underlying bones. For example, the skull motion is defined by a rigid transformation matrix $M_s$. The jaw motion is linked to the skull 208 at a pivot point, o, represented as a joint with two degrees of freedom for rotation θ and one degree of freedom for translation t. The jaw motion is denoted as a jaw motion parameter $\Theta = \{\theta_X, \theta_Y, t_Z\}$. Considering the specific anatomical structure of a face, the anatomical skull and jawbone are used to constrain the patches globally on the face so that deformation of the patches is jointly-constrained (using the local shape subspace and anatomical constraints) to be physically feasible. To employ the anatomical structure to constrain the patch motion, a link is established between the skin surface and the anatomical bones. The two parts are linked by modeling the behavior of the underlying soft tissue in-between the skin surface and the bones, as described in detail above.

At 710, the process 700 includes generating the anatomically-constrained model of the face by combining the local shape subspace and the anatomical subspace. The process 700 can also include performing facial performance tracking of the subject using the anatomically-constrained model of the face. In some examples, monocular or single view facial performance tracking is performed using input from a single camera. In some examples, multi-view facial performance tracking is performed using input from multiple cameras. The facial performance tracking (also referred to herein as facial performance capture or reconstruction) is described below with respect to FIG. 8.

As described further below, the local face model can be used to generate a new facial expression (as tracked using motion data) by defining new patch shapes, and moving the patches to the right place in the world corresponding also to the bone positions. A new patch shape can be created using a combination of the deformation shapes of that patch. This later stage is part of the facial performance tracking described below.

While the anatomically-constrained local model described above uses a face and a facial bone structure as an example, the local model is more generally applicable to objects other than faces. For example, an anatomically-constrained local model can be generated using the techniques described above (and the fitting technique using the model used) for any subject or object that has a rigid interior part and a soft, non-rigid outer part that is attached or otherwise tied to the rigid interior part, but that deforms in part independently from the rigid part. A face is one example of an object with a non-rigid outer part (skin and tissue) and a rigid inner part (a skull and jawbone), but the techniques described herein can apply equally to other objects. For example, another object that can be modeled includes a part of a fictional character other than a face that includes a non-rigid outer shell and a rigid structure that constrains the outer shell. The shell includes a non-rigid, soft tissue-like substance that is attached to and deforms relative to the rigid structure over time. The rigid structure can be made up of rigid structural components that operate similarly to bones in a body, moving over time to cause the object to move. As used herein, the term skin can apply generally to the outer, non-rigid component of an object, and the term bone, skull, or jaw bone can apply to any structural component of an object's rigid structure. For example, a fictional character may include a stoneskeleton (the rigid structure of an anatomical subspace for the character) and an outer shell made up of non-organic material (the skin and tissue of the character).

FIG. 7B illustrates an example of a process 720 of generating an anatomically-constrained local model of a part of a subject. The part can include any part of any subject that has a rigid structural component and an outer non-rigid component. Process 720 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 720 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 720 may be performed by a computing device, such as the model generator 104 or the computing system 1900 implementing the model generator 104. For example, the computing system 1900 may operate the model generator 104 to perform the process 720.

At 722, the process 720 includes obtaining one or more three-dimensional (3D) shapes of the part of the subject. The 3D shapes represent a deformation of the part at a given point in time (similar to an expression of a face). For example, a 3D shape may include an arm of a fictional character being flexed to produce a bulging muscle. At 724, the process 720 includes segmenting the part into a plurality of patches. A technique similar to that described above with respect to FIG. 2A may be used to segment the part. For example, the patches can be defined using a uniform segmentation across the part, or can be defined with reference to physical characteristics or properties of the part. One example can define the patches by applying a uniform segmentation in the UV space of the part. The segmented patches can be defined to overlap with neighboring patches. In some cases, the patches can be overlapped by performing a non-overlapping segmentation, and then dilating each patch by a fixed amount, as previously described. In some aspects, patches can be split if they contain disconnected regions to ensure that each patch is a single connected region.

At 726, the process 720 includes determining a local shape subspace. The local shape subspace includes a plurality of deformation shapes or components for each patch of the plurality of patches. For example, the local shape subspace of a patch includes a plurality of deformation shapes for that patch. A deformation shape of a patch defines a deformation of the patch for an observed shape of the part. For example, each of the patches deform when the part makes a given shape. This deformation of a patch for a given shape is defined by a deformation shape. Determining the local shape subspace can include determining the plurality of deformation shapes by removing rigid motion from the obtained one or more three-dimensional shapes. For example, the process 720 can include aligning a deformed patch of an obtained three-dimensional shape of the part with a corresponding neutral patch of a neutral shape of the patch to obtain an aligned patch. The process 720 can further include subtracting a neutral shape of the corresponding neutral patch from the aligned patch to obtain a deformation shape for the deformed patch. This process can be repeated for each different shape of the part to determine the plurality of deformation shapes for the patch that correspond to the different shapes. A similar process can be repeated for the other patches to obtain the deformation shapes corresponding to the different observed shapes. For example, for a single patch, the process 720 can go through all part shapes and build up the local shape space for that patch. The process 720 can then take another patch and go through all shapes again. In another example, the process 720 can make a single pass through the shapes of the part, and can simultaneously build up the shape spaces of all patches at once.

For example, similar to that described above, the local shape subspace for the patches can be determined once the part is segmented into patches. Similar to that shown in FIG. 2A, a local shape subspace 204 can be determined for patch i and a local shape subspace 206 can be determined for patch j. To obtain the local shape (or skin deformation) subspace, the subject-specific deformation is captured for each patch in correspondence. A neutral scan of the part and a set of K part shapes can be captured and reconstructed using any suitable performance capture method. From these tracked reconstructions, the local deformation subspace can be extracted. For example, as described previously, the neutral mesh is segmented into N patches. A K+1 shape subspace is then built for each patch by first aligning the K patch shapes to corresponding neutral patch shapes in the neutral mesh (e.g., using Procrustes alignment, or other suitable alignment technique used to minimize the center of mass of the patches being aligned). The neutral patches are subtracted from the aligned patches to obtain a deformation component for each shape. The deformation component represents the difference between a deformed patch from one of the K part shapes and a corresponding neutral patch from the neutral shape. By subtracting out the neutral patches, the rigid motion is removed and the non-rigid deformation of the patches remains. The resulting subspace for a patch i, for example, includes the neutral shape $U_i$ and K deformation components $\{D_i^1, \ldots, D_i^K\}$. The local shape subspace for a patch i can thus include a plurality of deformation components $D_i$ (also referred to as deformation shapes). A patch can then be reconstructed during performance tracking as a linear combination of the deformation components according to local blend coefficients, as shown in Equation 1. The reconstruction and performance tracking, for example described in FIG. 8 below, is applicable for any object, including a face.

At 728, the process 720 includes determining an anatomical subspace. The anatomical subspace includes a rigid structure constraining each of the plurality of patches. For example, the rigid structure constrains deformation and movement of each of the plurality of patches. The rigid structure can include one or more bones (e.g., a skull, a jawbone, or both the skull and the jawbone), a non-organic structure (e.g., a rigid structure with different structural components made of stone, metal, or other non-organic material), or any other rigid structure. One example of the rigid structure is shown in FIG. 2B. A link can be established between the part surface and the components of the rigid structure in order to use the anatomical structure to constrain the patch motion. The two parts can be linked by modeling the behavior of the underlying non-rigid tissue in-between the part surface and the structural components.

At 730, the process 720 includes generating the anatomically-constrained model of the part by combining the local shape subspace and the anatomical subspace. The process 720 can also include performing performance tracking of the subject using the anatomically-constrained model. A technique for facial performance tracking is described below with respect to FIG. 8, which may also apply in general to performance tracking using a generic local model of a face or any other part of a subject.

Figure 8:
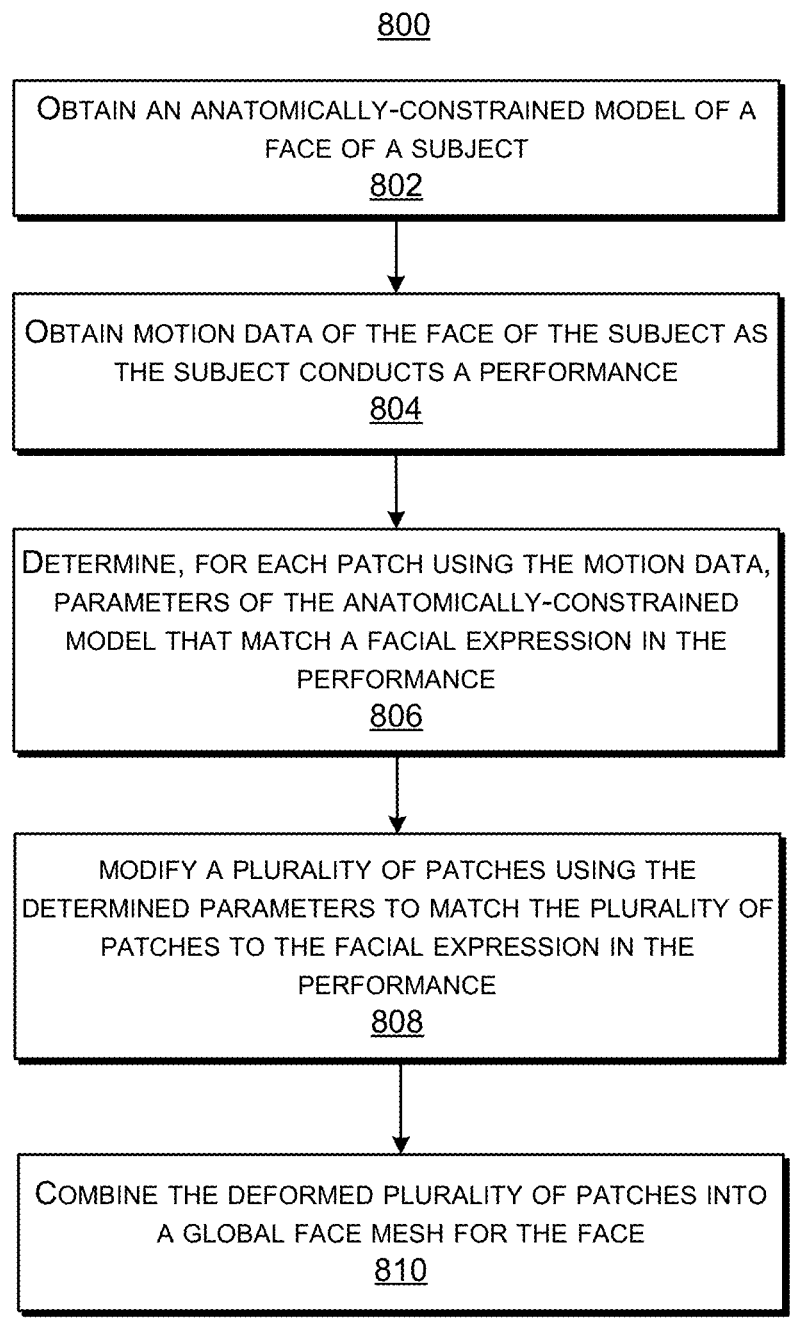
FIG. 8 illustrates an example of a process of performing facial performance tracking of a subject using an anatomically-constrained model of a face of the subject, in accordance with one embodiment of the present invention.

FIG. 8 illustrates an example of a process 800 of performing facial performance tracking of a subject using an anatomically-constrained model of a face of the subject. The process 800 is also applicable to tracking movement and deformation of other objects, such as a part of a character or other object. Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 800 may be performed by a computing device, such as the facial performance capture engine 114 or the computing system 1900 implementing the facial performance capture engine 114. For example, the computing system 1900 may operate the facial performance capture engine 114 to perform the process 800.

At 802, the process 800 includes obtaining the anatomically-constrained model (also referred to herein as the local face model when applied to faces, or a local model when applied to other objects). The anatomically-constrained model includes a combination of a local shape subspace and an anatomical subspace. The local shape subspace includes deformation shapes for each patch of a plurality of patches. The patches represent a geometry of the face (or other part of a subject) after the face is segmented into the patches. A deformation shape of a patch defines a deformation of the patch for an observed facial expression (or shape of a part). The anatomical subspace includes an anatomical bone structure (or other rigid structure) constraining each of the plurality of patches.

At 804, the process 800 includes obtaining motion data of the face of the subject as the subject conducts a performance. In some examples, motion data of other parts of a subject can be obtained. In some examples, the motion data is determined from a single or multiple views. For example, the motion data can be determined from one or more images of the face of the subject captured by one or more cameras or other capture device. The images can be captured by any suitable image capture device, such as a production-quality studio camera, a camera available in a consumer device (e.g., a smartphone or other portable or mobile device), a digital camera, a head-mounted camera, or any other suitable camera. In some embodiments, the image capture device can include multiple cameras. In one example, the images can be captured of the subject during a live-action performance during a scene of a movie or other media work. In some examples, the motion data can be determined from marker data obtained using markers attached to the subject's face, or from an illustration of the face drawn by an artist. The motion data can be determined using any suitable technique, such as optical flow.

At 806, the process 800 includes determining, for each patch using the motion data, parameters of the anatomically-constrained model that match a facial expression in the performance (or a shape of a part at a given point in time). The determined parameters of the local face model adhere to the local shape subspace of the patches and also to the input motion data that is observed at a given point in time. The parameters can be used to modify the patches to match the motion data as closely as possible. Determining the parameters of the anatomically-constrained model for a given point in time can include determining rigid local patch motion for each patch, which defines a position of a patch on the subject's face. Further, local patch deformation of each patch can be determined. The local patch deformation of a patch is defined by a combination of deformation components for the patch, as influenced by a set of local blend coefficients. The rigid motion of the underlying bone relative to each patch can be determined.

As described above, the solution can be formulated as an energy minimization problem for each frame t. The energy term E(t) that is solved for can include several energy terms or constraints, which are described in detail above. For example, the process 800 can include determining a motion constraint. The motion constraint constrains the deformation and motion of the plurality of patches to match the obtained motion data. The process 800 can also include determining an overlapping constraint, which constrains overlapping vertices of neighboring patches to deform alike. The process 800 can also include determining an anatomical constraint. The anatomical constraint constrains deformation of the plurality of patches to the anatomical bone structure, ensuring that patches remain plausibly connected with the bone structure. In some embodiments, the anatomical constraint is used to predict rigid motion of the anatomical bone structure. For example, as described above, a by-product of using the anatomical constraint includes the anatomical bone tracking result being used to automatically estimate a rigid stabilization of the face sequence. This is due to the rigid bone motion being predicted during the technique described above, resulting in the skull position already being solved for during the facial performance tracking. The process 800 can also include determining a temporal constraint, which constrains an amount of deformation change of a patch and a position change of the patch during a given time period.

At 808, the process 800 includes modifying the plurality of patches using the determined parameters to match the plurality of patches to the facial expression in the performance (or the shape of the part at the given point in time). Modifying the plurality of patches using the determined parameters can include deforming a shape of each of the plurality of patches and moving each of the plurality of patches to a position on the face. For example, a shape i can be deformed and moved to a portion of the subject's face according to the determined parameters. In some examples, the solution defining each deformed patch can be formulated as an energy minimization problem for each frame t, such as using Equation 6 described above. In one example, the energy minimization problem can be solved by a Gauss-Newton solver using a Guass-Newton method.

At 810, the process 800 includes combining the deformed plurality of patches into a global face mesh for the face (or a global part mesh for the part). As described above, the result of the local tracking technique (single-view or multi-view) using the anatomically-constrained local subspace face model is a set of distinct local skin patches and the anatomical bone positions for each frame. The process 800 can combine the patches into a single global face mesh using a global patch blending technique. In order to obtain a seamless reconstruction that results in a single global face mesh with smooth boundaries, the global patch blending technique can blend all vertices (not just the ones that were in overlap regions). As described in detail above, a weighted averaging method can be performed, giving higher influence to patches for which the vertex is geodesically closer to the center of the patch.

As previously mentioned, and as demonstrated by the results discussed below, the local shape face model described herein is more expressive than a global blend-shape model, and requires many fewer training shapes. In addition to the number of shapes employed to create the subspace (K), the local shape face model is also largely influenced by the size of the patches (N). The patch size essentially determines the locality of the model and trades flexibility versus robustness. The impact of these two quantities on the model is analyzed to determine appropriate values. For example, a good patch size can be determined, and the expressions to include can be identified. To ensure the analysis is not influenced by errors in the input data (e.g. from optical flow), ground truth 2D motion vectors can be used. The degradation of the technique under imperfect input data is discussed below. To obtain the ground truth, experiments can be performed on a sequence, and the known mesh motion can be projected onto the image plane of one camera. This approach also provides ground truth geometry to analyze the single-view reconstruction error.

Figure 9A:
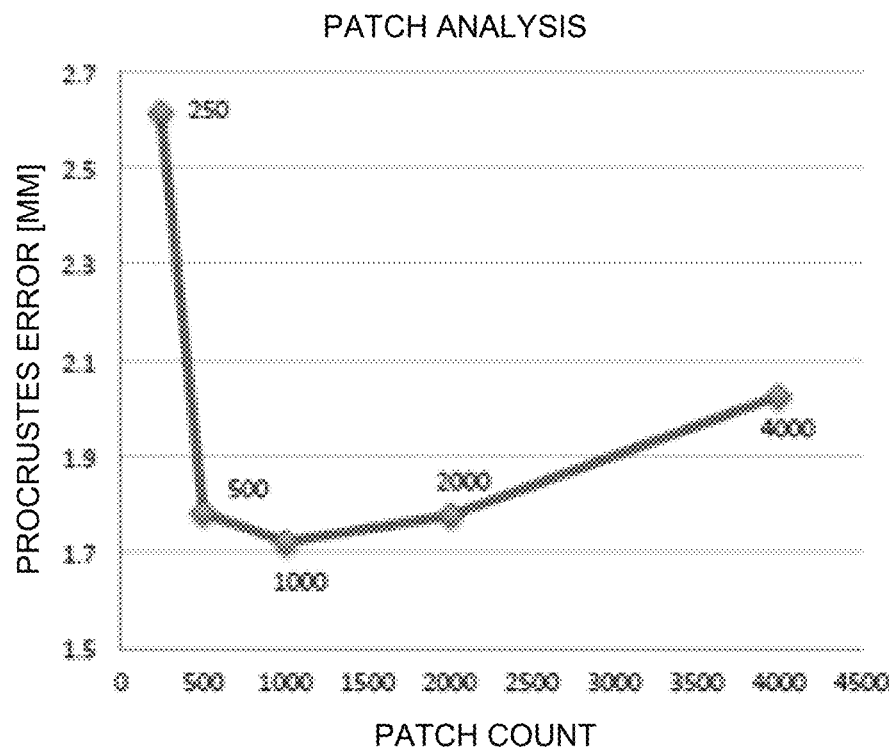
FIG. 9A illustrates a graph showing Procrustes Error for different patch counts.

With regard to patch size analysis, the size of the patches directly influences the locality of the model. The smaller the patches, the better the model will fit to the input data (monocular or multi-view) in the image plane, but at the same time the depth will be less well-constrained. To identify the optimal patch size, varying patch sizes can be tested by fitting the local face model to a number of frames (e.g., 50, 75, 100, 150, 160, 200, or other suitable number of frames) that contain substantial skin deformation. As error measurement, the Procrustes distance can be used, which corresponds to the average Euclidean distance between the fit and the provided ground truth shape. As can be seen in FIG. 9A, a partition into approximately 1000 patches gives the best result with the lowest Procrustes distance or error. As can also be seen, the exact number of patches is not critical since the quality degrades by a small amount around the optimum. As a result, a subject's face can be segmented into approximately 1000 patches to obtain quality results.

Expression shape analysis can also be used to determine which shapes to use in the local shape subspace of the local face model. As previously described, when building an actor-specific rig, a well-defined set of shapes is typically obtained by scanning the actor. One example includes a face set containing over 100 shapes. For practical reasons, the analysis herein focuses on a common subset of 26 expressions, which is capture for all three of the subject actors. To determine which of these expressions to include in the subspace, an iterative approach can be taken. For example, the iterative approach can start with the neutral expression and can iteratively add the most significant missing shape to the subspace. The most significant shape can be defined as the one that is least well explained by the current subspace, and consequently will expand the subspace the most. The shapes can then be ranked. To rank the shapes, all local patches are therefore fit to all candidate shapes using the current subspace and the procrustes distance can again be computed. To reduce the danger of over fitting to one subject, the distance on all of the three subject actors can be computed simultaneously. If the next most significant candidate is an asymmetric expression, its counterpart can also be included into the subspace to prevent biasing the model to one side.

Figure 9B:
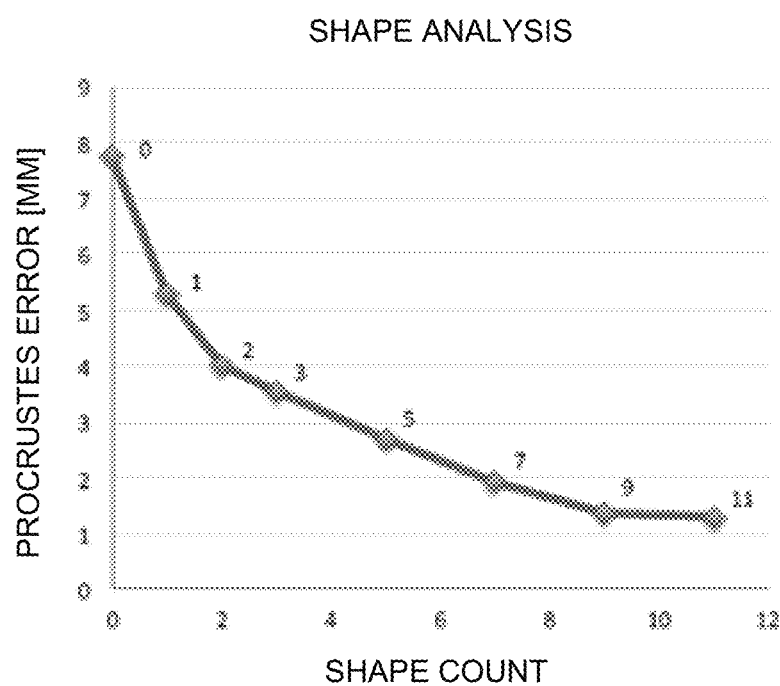
FIG. 9B illustrates a graph showing Procrustes Error for different shape counts.
Figure 10:
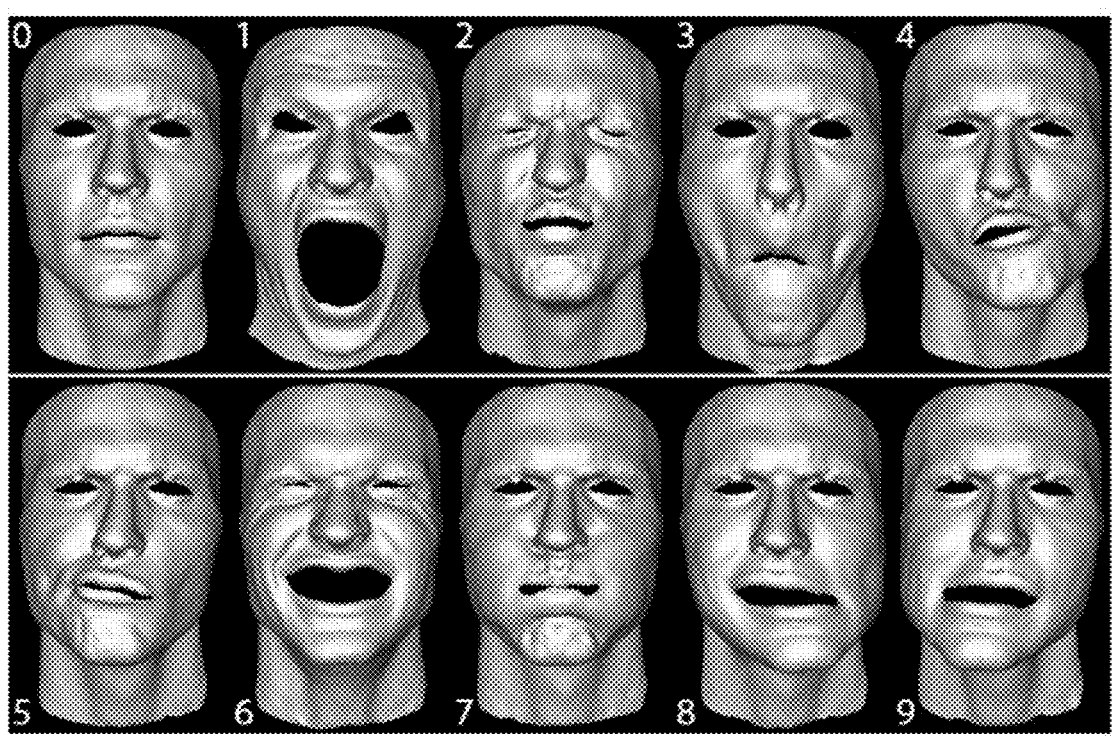
FIG. 10 illustrates a shapes determined for use in a local shape face model based on shape analysis.

To assess the quality of the subspace, the subspace can be tested on a validation sequence of approximately 480 frames (or other suitable number of frames), for which there is also ground truth data. FIG. 9B summarizes the results of the shape analysis and shows that the Procrustes Error is reduced exponentially by incrementally adding the most significant blendshape to the model. Using one example, the nine most significant shapes (Shape 1 through Shape 9) plus a neutral shape (Shape 0) are shown in FIG. 10. As shown in FIG. 9B, anatomically-constrained local face model described herein can cut the error in half with the two most significant shapes, including the open and closed faces where the actor stretches and compresses the complete face as much as possible. From this analysis, it is found that nine expressions plus neutral provide a good tradeoff in terms of fitting accuracy over model complexity, and thus a nine-dimensional subspace can be used. One of ordinary skill in the art will appreciate that any other number of shapes can be used in the local shape subspace. In contrast to typical global models that require over 100 shapes in industry practices, the local model allows for an order of magnitude reduction in the number of shapes and hence amount of pre-processing work required to build the local face model.

Various results are now described taking into account the local face model and techniques described herein. The techniques described above are analyzed quantitatively and qualitatively, and are compared to other models. Further, the versatility of these techniques are demonstrated in several different application scenarios, including dense optical flow based performance capture, sparse marker based motion capture, and very sparse direct manipulation via a sketch interface.

For example, the performance of the proposed techniques are demonstrated on three different actors over a large variety of monocular input data, including dense optical flow from high-quality cameras, outdoor footage from smart phones and helmet-mounted GoPro™ cameras, as well as sparse marker tracks from MoCap data, and even artist-created input sketches. The improvement of the proposed anatomically-constrained local subspace tracking is quantitatively assessed over traditional global tracking, as well as local tracking without the anatomical constraints described herein. Further, to highlight the flexibility of the techniques described herein, extreme skin deformations that occur from external forces (such as blowing wind) and secondary motion are captured.

As described above when discussing patch and shape analysis, ground truth motion is used for the evaluation. The performance is then analyzed under imperfect input data. The analysis can begin by assessing the importance of the local shape subspace and the anatomical constraints. For this, the model is compared to the traditional global model as well as a naive local model that does not use anatomical constraints. For the global model, all 26+1 blendshapes available are used. For the local models, a subset of 9+1 shapes are employed, such as those shown in FIG. 10. The '+1' refers to the neutral shape. For completeness, anatomical constraints are added to the global model for comparison. Table 1 lists mean Procrustes errors and standard deviations for all five models.

|  |  | G26 | G9 | GA9 | L9 | LA9 |
|---|---|---|---|---|---|---|
| GT Motion | $\mu$ | 3.01 | 7.57 | 5.40 | 5.44 | 1.39 |
|  | $\sigma$ | 1.73 | 3.14 | 1.82 | 3.64 | 0.61 |
| Dense O-Flow | $\mu$ | 7.90 | 10.86 | 9.36 | 8.95 | 5.01 |
|  | $\sigma$ | 2.44 | 4.41 | 3.65 | 3.95 | 0.76 |
| Sparse Markers | $\mu$ | 5.22 | 9.26 | 6.11 | 7.83 | 1.88 |
|  | $\sigma$ | 2.98 | 2.97 | 2.89 | 4.73 | 0.77 |

The model comparison of Table 1 shows a list of mean Procrustes error ($\mu$) and standard deviation ($\sigma$) computed over 480 frames. For conciseness, 'G/L' specifies the model (global/local), 'A' indicates that anatomical constraints were used, and the number stands for the amount of shapes employed to build the subspace in addition to the neutral. The anatomically-constrained local shape face model (rightmost column) performs best in all cases. The first row reports errors under perfect motion input, the second row shows how the models degrade under real world conditions using optical flow as input data, and the third row shows the impact of reducing the density of the input data. As can be seen, the local face model clearly outperforms the other methods for all scenarios.

Figure 11A:
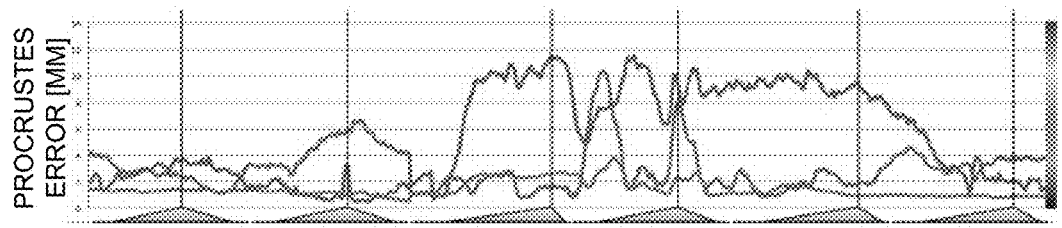
FIG. 11A and FIG. 11B illustrate how the errors are distributed using different modeling techniques.
Figure 11B:
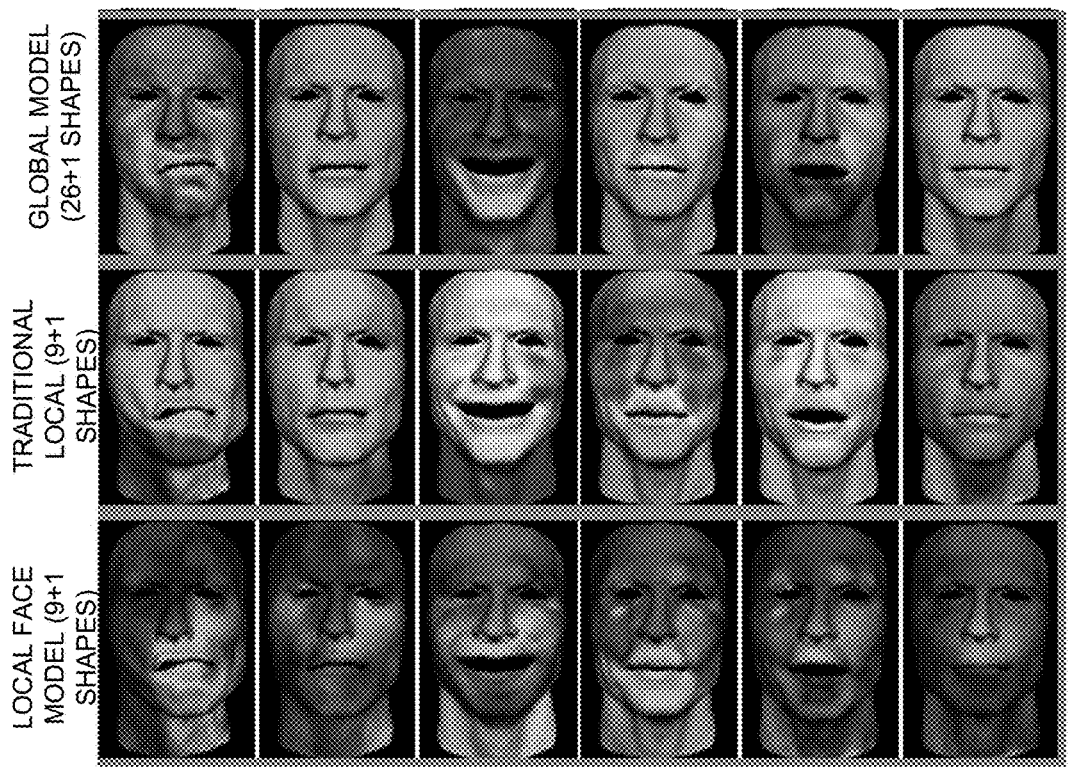

Under perfect input data, the proposed technique with 9+1 shapes (see FIG. 10) outperforms the full global model with 26+1 shapes by more than a factor of two and the naive local model almost by a factor of four. FIG. 11B indicates how the errors are distributed using the different models, and shows that both global and local models distribute the error over the full face due to the least squares norm used. Using the local face model tends to concentrate the error predominantly at the neck, where anatomical constraints may not provide robustness. The graph shown in FIG. 11A shows that the local face model performs consistently well over all 480 frames, while the other models show great temporal variation. For the global model, the temporal variation stems from the fact that the global model performs well when the expression is part of the subspace, but the global model cannot extrapolate other shapes at all. Therefore, global models are required to include many more shapes than local models. As shown in FIG. 9B, the local face model can achieve similar performance to the global model (with 26+1 shapes) already with only 4+1 shapes, meaning the local face model requires 6-7 times less expressions of the subject to be captured, processed, and stored. Without the anatomical constraints described herein, local models suffer from depth ambiguities, leading to the worst overall performance. Adding anatomical constraints not only improves the quality of the local model substantially, but also helps to constrain the global model better, as it adds stabilization to the global model which effectively reduces the amount of error shifted from fitting the non-rigid expression to the rigid head pose.

Under imperfect input data, referring to Table 1 above, the performance of all models deteriorates. Considering the low standard deviation, however, indicates that the gross error of the technique using the local face model is due to head pose depth estimation, while the relative expression to the skull is very accurate. This hypothesis is confirmed by computing the Procrustes error after stabilization, which reduces the error from 5.01 mm down to 1.68 mm. Thus, even though the absolute head pose in depth may not be estimated perfectly accurately, the relative expression motion is recovered very well, which is positive since this is important information for many applications, such as retargeting.

Figure 12:
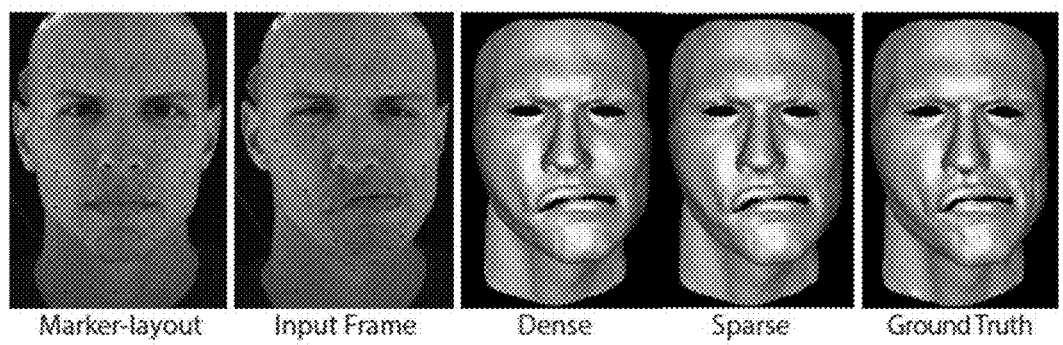
FIG. 12 illustrates examples of results of the local face model fitting technique based different amounts of input data.

The last row of Table 1 shows the performance under sparse input data provided by a set of approximately 110 markers distributed on a subject's face, as depicted in FIG. 12. Since marker positions are typically tracked very accurately and robustly, ground truth 2D motion can again be used at these sparse locations. For example, at the marker locations, 2D motion vectors may be provided from ground truth to mimic the fact that the markers can be tracked very accurately and robustly. The technique using the local face model degrades only minimally for this sparse input data, leading to visually very similar expressions as can be seen in FIG. 12. For example, the recovered mesh computed using sparse input (fourth column) is visually almost indistinguishable from the mesh computed with dense input (third column) and also very similar to ground truth (fifth column). This indicates that our method is very well suited to augment traditional marker based motion capture pipelines.

Figure 13:
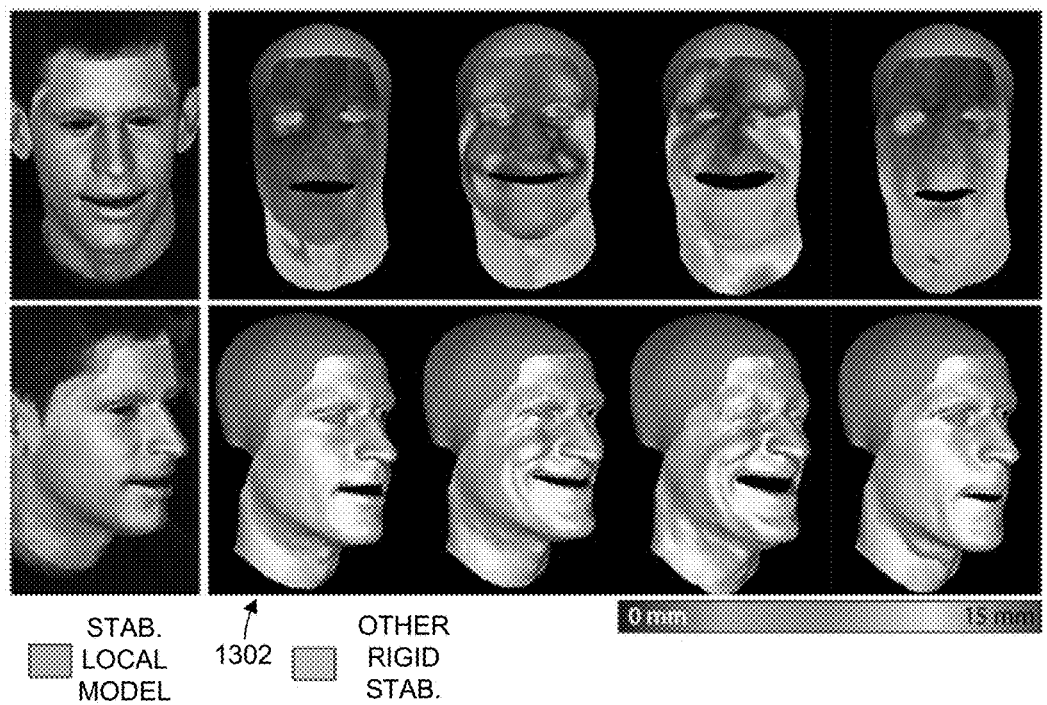
FIG. 13 illustrates results of stabilization using the local face model fitting technique.

As previously described, the local face model fitting technique provides a beneficial side-effect of producing shapes that are implicitly stabilized. Stabilization refers to the process of removing the rigid motion of the head to recover the true expression changes and is essential, for example, for performance transfer to a character. Traditional stabilization techniques are a tedious, time consuming, and oftentimes manually assisted process. To assess the quality of the estimated skull motion, FIG. 13 shows a comparison of stabilization using the local face model versus another rigid stabilization technique. The local face model technique described above implicitly stabilizes the shapes since it estimates the rigid skull transformation, which allows computation of the skin deformation relative to the skull. This is less susceptible to depth ambiguities than the absolute position, as shown in by image 1302. It can be seen from FIG. 13 that the two techniques achieve very similar results. As mentioned before, most of the error is concentrated on the neck, not affecting the face itself.

Figure 14:
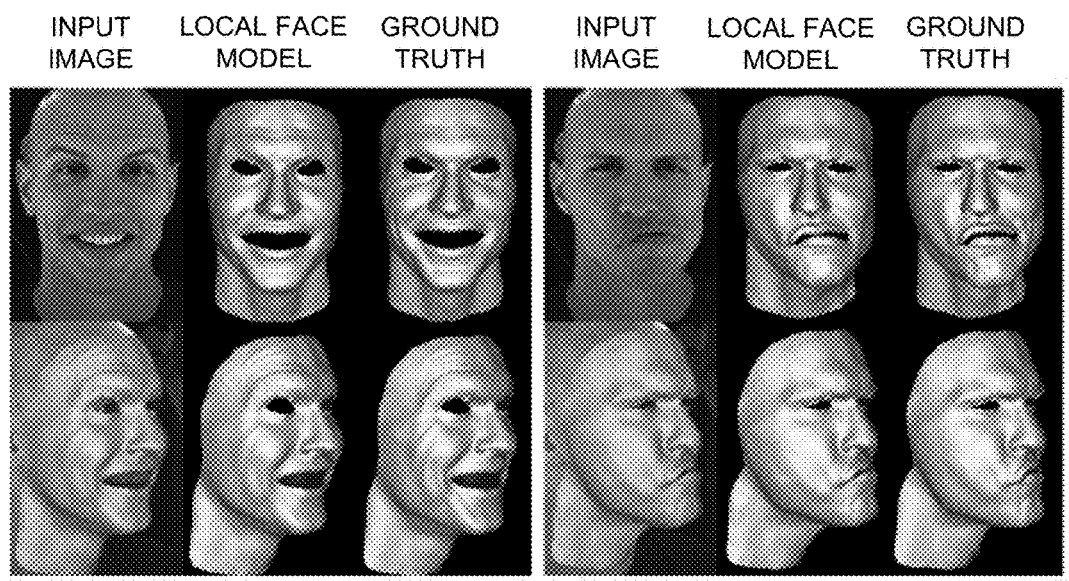
FIG. 14 illustrates a qualitative evaluation of the local face model fitting technique using two example expressions.

The robustness and versatility of the proposed method can be demonstrated using a variety of input sources to the facial performance capture process. Dense input may be used in some examples. Three examples are described that use dense optical flow as the data term. FIG. 14 shows results of two different expressions using dense ground truth motion. The results were achieved in a studio setup, where a synchronized side camera was added for validation. The local face model technique achieves visually very similar results from a single camera where other techniques use seven or more cameras. The biggest visible difference can be found in the less-pronounced wrinkles where they are not part of the local shape subspace of the local face model.

FIG. 15 shows results on footage acquired from consumer-grade cameras, including a helmet-mounted GoPro™ camera (left) and a handheld iPhone 5 (right), both captured outside under overcast sky. Such setups are very compelling as they require only very affordable hardware and impose only minimal constraints onto the actor. The GoPro sequence contains much secondary motion as the actor moves, and also substantial camera-shake. Nevertheless, the local face model fitting technique robustly reconstructs the facial expressions over time, since it implicitily stabilizes the face via the anatomical constraints.

Figure 16:
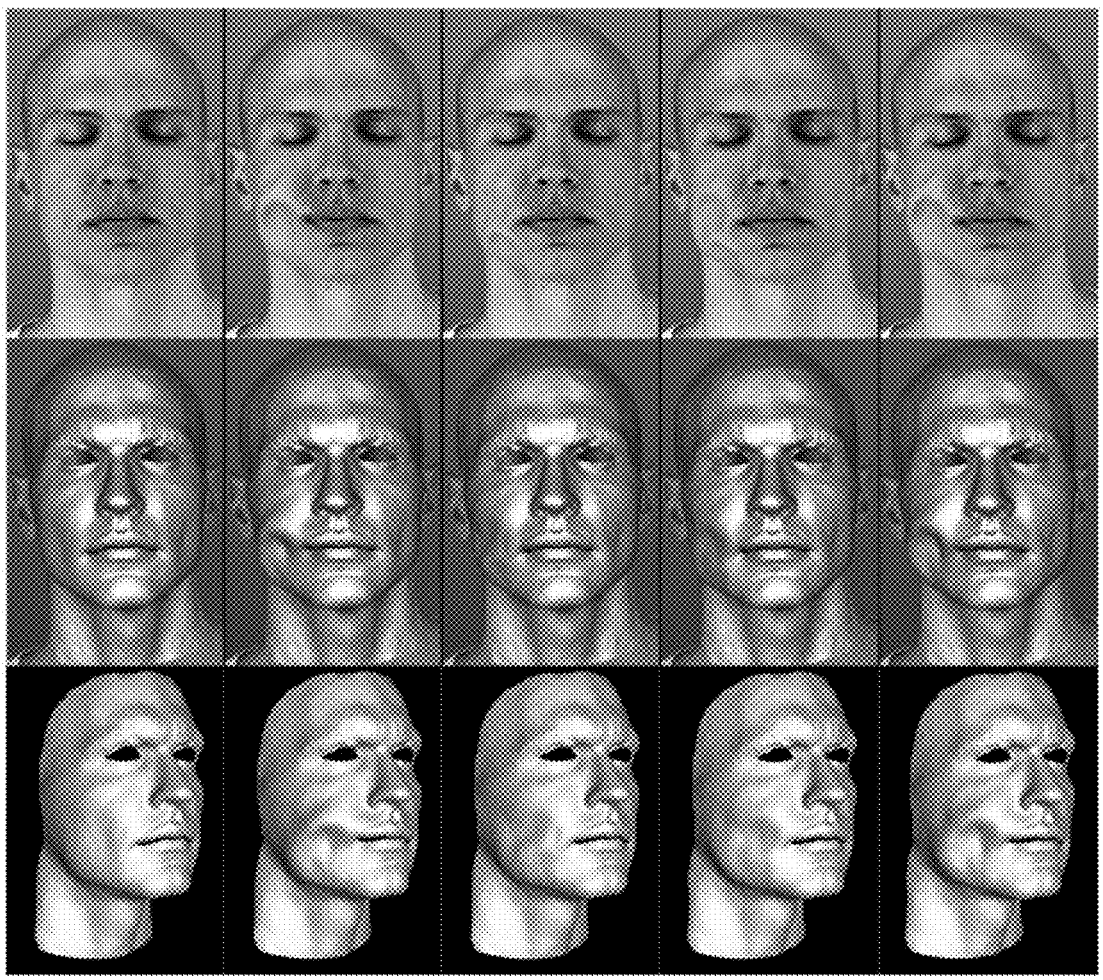
FIG. 16 illustrates results of the local face model fitting technique in view of extreme conditions.

FIG. 16 demonstrates a very challenging use case, where an actor is captured with a high-speed camera at 240 fps while compressed air is blown at the actor's face. The stream of air forms ripples on the actor's cheek propagating upwards. Capturing such a scenario with a global model would be nearly impossible since the external forces create face shapes that are far outside the pre-acquired expression or blendshape space. The anatomically-constrained local face model is capable of reproducing these ripples due to the locality of the local shape subspace, allowing the local face model to extrapolate outside of the pre-captured shapes. The results are impressive, especially since the optical flow estimation can be inaccurate at times.

Sparse input can also be used in some examples. The local face model does not require dense input, and performs well when constraining only a very small subset of the vertices. FIG. 12 provides a marker-based motion capture setup, where the actor's face is covered with a sparse set of markers. These markers can be tracked over time and used as sparse constraints to the local face model fitting technique. The result is visually almost identical to using dense constraints, and also very similar to the high-quality shapes of the ground truth results. The last row in Table 1 above supports these findings quantitatively, showing the error increases only slightly when using sparse constraints as input to the anatomically-constrained local face model.

Figure 17:
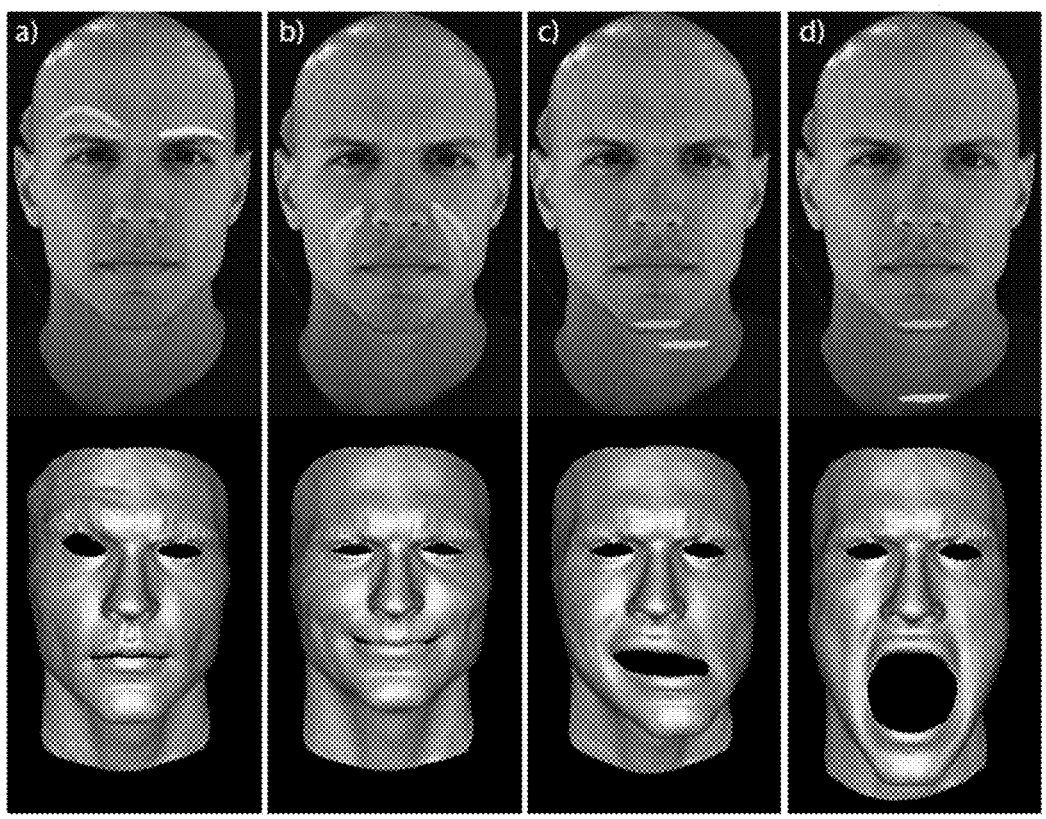
FIG. 17 illustrates artistic control of shape deformation.

The fitting method using the local face model can handle very sparse input constraints, which opens up possibilities for direct control. Reducing the input even further than the sparse example above, FIG. 17 shows an application of direct, user-guided manipulation. In an illustration or sketch-based interface, a user or artist can draw a set of source (green) and target strokes (blue) onto the 2D face image to control its deformation. The fitting technique can deform the actor's face according to the strokes, adding a large scale expression change and skin wrinkling, and can even cause the jaw to move. The yellow stroke in column a) indicates that source and target strokes coincide. Drawing on an image in 2D instead of manipulating a shape in 3D can be very attractive for less technical users. For example, by fixing a stroke on the left eyebrow and moving a second stroke on the right eyebrow upwards, the system plausibly synthesizes a shape including forehead wrinkles on the right side of the face. In column c), the chin area is translated with a single stroke, causing also the underlying jaw to move. The artistic control can lead to shapes which are physically not achievable by the actor, such as shown in column d). For example, in column d), the jaw has been constrained into an extremely wide open position by the artist, yet still the resulting shape does look plausible. This could allow for cartoony and stylized facial animation, where expressions are oftentimes exaggerated.

Figure 18:
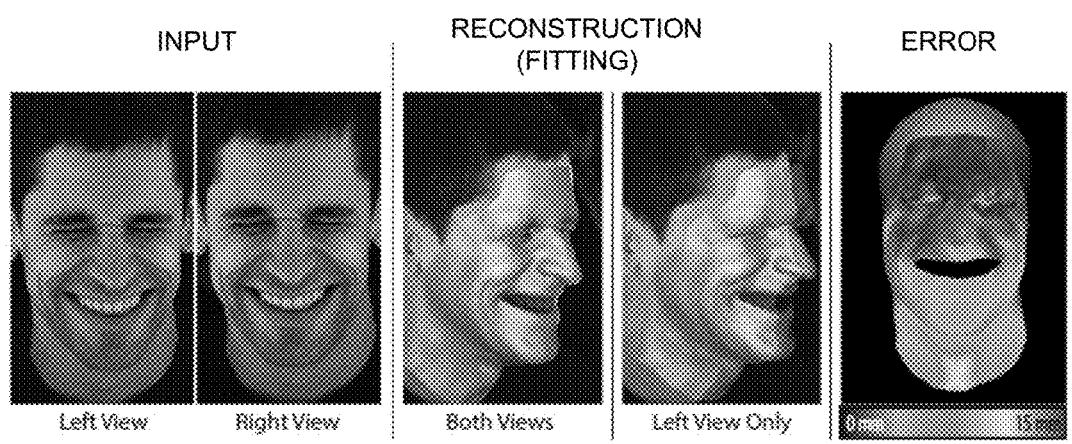
FIG. 18 illustrates results of a multi-view fitting technique using the local face model.

The above-described fitting technique using the local model can be used for multiple views, not only monocular or single-view fitting. Adding additional views to the single view, be it overlapping or not, simply adds additional equations to the motion energy $E_m$ introduced in Equation 8. By adding just one more camera view, the absolute depth can be recovered better than the monocular case, and also the relative skin deformation is improved. For example, the slight error in absolute depth can be removed, as shown in FIG. 18. Even though there may exist minor errors in the monocular case when estimating absolute depth, the relative deformations caused by the expression can be faithfully recovered due to the anatomical constraints, as can be seen in FIG. 13.

As described above, the anatomically-constrained local shape model and the facial performance capture technique is much more expressive than the traditionally employed global models and requires many fewer expressions to be pre-acquired. Unlike other local models, the proposed combination with anatomical constraints renders it extremely robust and allows recovery of shapes at very high accuracy. In addition, the performance capture technique simultaneously provides an estimate of the underlying skull bone, which allows stabilization of the captured performance. The stabilization allows only extraction of the motion caused by the expression itself without superposition of the head motion.

Figure 19:
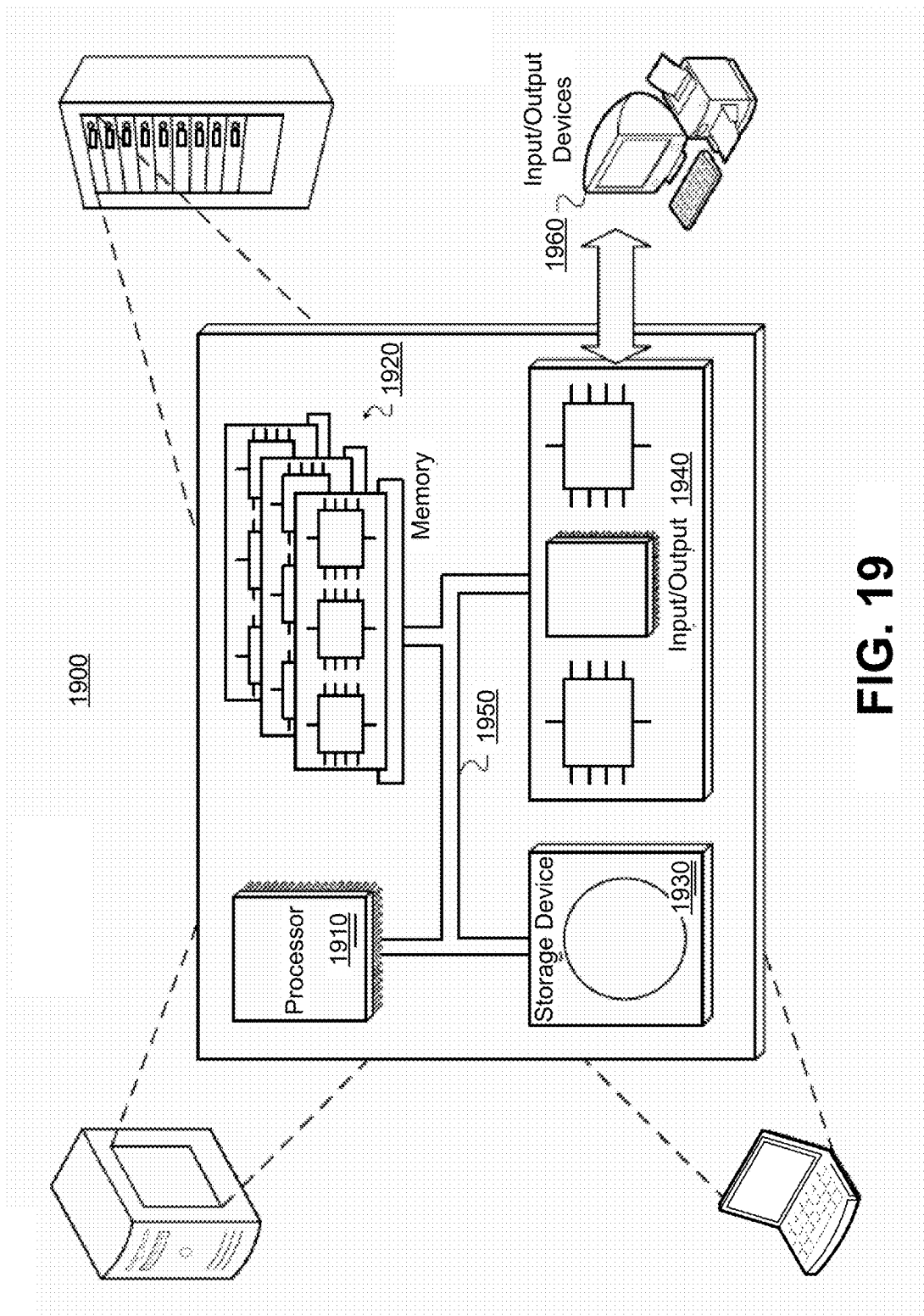
FIG. 19 shows an example of a computer system that may be used in various embodiments of the present invention.

Referring to FIG. 19, a schematic diagram is shown of an example of a computing system 1900. The computing system 1900 is exemplary only and one having skill in the art will recognize that variations and modifications are possible. The computing system 1900 can be used for the operations described above. For example, the computing system 1900 may be used to implement any or all of the motion capture techniques described herein.

The system 1900 includes a processor 1910, a memory 1920, a storage device 1930, and an input/output interface 1940. Each of the components 1910, 1920, 1930, and 1940 are interconnected using a system bus 1950. The processor 1910 is capable of processing instructions for execution within the system 1900. In one implementation, the processor 1910 is a single-threaded processor. In another implementation, the processor 1910 is a multi-threaded processor. The processor 1910 is capable of processing instructions stored in the memory 1920 or on the storage device 1930 to provide graphical information via input/output interface 1940 for display on a user interface of one or more input/output device 1960.

The memory 1920 stores information within the system 1900 and may be associated with various characteristics and implementations. For example, the memory 1920 may include various types of computer-readable medium such as volatile memory, a non-volatile memory and other types of memory technology, individually or in combination.

The storage device 1930 is capable of providing mass storage for the system 1900. In one implementation, the storage device 1930 is a computer-readable medium. In various different implementations, the storage device 1930 may be a floppy disk device, a hard disk device, an optical disk device, or a tape device.

The input/output device 1960 provides input/output operations for the system 1900. In one implementation, the input/output device 1960 includes a keyboard and/or pointing device. In another implementation, the input/output device 1960 includes a display unit for displaying graphical user interfaces.

The features described herein can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of performing facial performance tracking of a subject using an anatomically-constrained model of a face of the subject, the method comprising:
    obtaining the anatomically-constrained model, the anatomically-constrained model including a combination of a local shape subspace and an anatomical subspace, the local shape subspace including deformation shapes for each patch of a plurality of patches representing a geometry of the face, wherein a deformation shape of a patch defines a deformation of the patch for an observed facial expression, and wherein the anatomical subspace includes an anatomical bone structure constraining each of the plurality of patches;
    obtaining motion data of the face of the subject as the subject conducts a performance;
    determining, for each patch using the motion data, parameters of the anatomically-constrained model that match a facial expression in the performance, the parameters including rigid local patch motion defining one or more positions of each patch on the face, local patch deformation of each patch defined by a combination of deformation components for each patch, and rigid motion of one or more underlying bones of the anatomical bone structure relative to each patch;
    modifying the plurality of patches using the determined parameters to match the plurality of patches to the facial expression in the performance; and
    combining the deformed plurality of patches into a global face mesh for the face.

2. The method of claim 1, wherein modifying the plurality of patches using the determined parameters includes deforming a shape of each of the plurality of patches and moving each of the plurality of patches to a position on the face.

3. The method of claim 1, further comprising determining a motion constraint, the motion constraint constraining deformation and motion of the plurality of patches to match the obtained motion data.

4. The method of claim 1, further comprising determining an overlapping constraint, the overlapping constraint constraining overlapping vertices of neighboring patches to deform alike.

5. The method of claim 1, further comprising determining an anatomical constraint, the anatomical constraint constraining deformation of the plurality of patches to the anatomical bone structure.

6. The method of claim 5, wherein the anatomical constraint is further used to predict rigid motion of the anatomical bone structure.

7. The method of claim 1, further comprising determining a temporal constraint, the temporal constraint constraining an amount of deformation change of a patch and a position change of the patch during a given time period.

8. The method of claim 1, wherein the motion data of the face is from a single point of view.

9. The method of claim 1, wherein the motion data of the face is obtained from one or more images of the face, from one or more markers placed on the face, or from an illustration of the face.

10. A system for performing facial performance tracking of a subject using an anatomically-constrained model of a face of the subject, comprising:
a memory storing a plurality of instructions; and
one or more processors configurable to:
obtain the anatomically-constrained model, the anatomically-constrained model including a combination of a local shape subspace and an anatomical subspace, the local shape subspace including deformation shapes for each patch of a plurality of patches representing a geometry of the face, wherein a deformation shape of a patch defines a deformation of the patch for an observed facial expression, and wherein the anatomical subspace includes an anatomical bone structure constraining each of the plurality of patches;
obtain motion data of the face of the subject as the subject conducts a performance;
determine, for each patch using the motion data, parameters of the anatomically-constrained model that match a facial expression in the performance, the parameters including rigid local patch motion defining one or more positions of each patch on the face, local patch deformation of each patch defined by a combination of deformation components for each patch, and rigid motion of one or more underlying bones of the anatomical bone structure relative to each patch;
modify the plurality of patches using the determined parameters to match the plurality of patches to the facial expression in the performance; and
combine the deformed plurality of patches into a global face mesh for the face.

11. The system of claim 10, wherein modifying the plurality of patches using the determined parameters includes deforming a shape of each of the plurality of patches and moving each of the plurality of patches to a position on the face.

12. The system of claim 10, wherein the one or more processors are configurable to determine a motion constraint, the motion constraint constraining deformation and motion of the plurality of patches to match the obtained motion data.

13. The system of claim 10, wherein the one or more processors are configurable to determine an overlapping constraint, the overlapping constraint constraining overlapping vertices of neighboring patches to deform alike.

14. The system of claim 10, wherein the one or more processors are configurable to determine an anatomical constraint, the anatomical constraint constraining deformation of the plurality of patches to the anatomical bone structure.

15. The system of claim 14, wherein the anatomical constraint is further used to predict rigid motion of the anatomical bone structure.

16. The system of claim 10, wherein the one or more processors are configurable to determine a temporal constraint, the temporal constraint constraining an amount of deformation change of a patch and a position change of the patch during a given time period.

17. A non-transitory computer-readable memory storing a plurality of instructions executable by one or more processors, the plurality of instructions comprising:
instructions that cause the one or more processors to obtain an anatomically-constrained model of a face of a subject, the anatomically-constrained model including a combination of a local shape subspace and an anatomical subspace, the local shape subspace including deformation shapes for each patch of a plurality of patches representing a geometry of the face, wherein a deformation shape of a patch defines a deformation of the patch for an observed facial expression, and wherein the anatomical subspace includes an anatomical bone structure constraining each of the plurality of patches;
instructions that cause the one or more processors to obtain motion data of the face of the subject as the subject conducts a performance;
instructions that cause the one or more processors to determine, for each patch using the motion data, parameters of the anatomically-constrained model that match a facial expression in the performance, the parameters including rigid local patch motion defining one or more positions of each patch on the face, local patch deformation of each patch defined by a combination of deformation components for each patch, and rigid motion of one or more underlying bones of the anatomical bone structure relative to each patch;
instructions that cause the one or more processors to modify the plurality of patches using the determined parameters to match the plurality of patches to the facial expression in the performance; and
instructions that cause the one or more processors to combine the deformed plurality of patches into a global face mesh for the face.

18. The non-transitory computer-readable memory of claim 17, wherein modifying the plurality of patches using the determined parameters includes deforming a shape of each of the plurality of patches and moving each of the plurality of patches to a position on the face.

19. The non-transitory computer-readable memory of claim 17, wherein the motion data of the face is from a single point of view.

20. The non-transitory computer-readable memory of claim 17, wherein the motion data of the face is obtained from one or more images of the face, from one or more markers placed on the face, or from an illustration of the face.

* * * * *